United States Patent
Ray et al.

(10) Patent No.: US 10,136,174 B2
(45) Date of Patent: Nov. 20, 2018

(54) PROGRAMMATIC TV ADVERTISING PLACEMENT USING CROSS-SCREEN CONSUMER DATA

(71) Applicant: VideoAmp, Inc., Santa Monica, CA (US)

(72) Inventors: Debajyoti Ray, Marina del Rey, CA (US); Ross McCray, Santa Monica, CA (US); David Gullo, Laguna Hills, CA (US); Jay Prasad, San Francisco, CA (US)

(73) Assignee: VideoAmp, Inc., Los Angeles, CA (US)

( * ) Notice: Subject to any disclaimer, the term of this patent is extended or adjusted under 35 U.S.C. 154(b) by 0 days.

(21) Appl. No.: 15/421,243

(22) Filed: Jan. 31, 2017

(65) Prior Publication Data

US 2017/0142465 A1    May 18, 2017

Related U.S. Application Data

(63) Continuation-in-part of application No. 15/219,262, filed on Jul. 25, 2016.
(Continued)

(51) Int. Cl.
*H04N 21/2668* (2011.01)
*H04N 21/2385* (2011.01)
(Continued)

(52) U.S. Cl.
CPC ......... *H04N 21/2668* (2013.01); *G06F 17/18* (2013.01); *G06Q 30/0251* (2013.01);
(Continued)

(58) Field of Classification Search
CPC ........... H04N 21/2668; H04N 21/2385; H04N 21/252; H04N 21/2547; H04N 21/25883;
(Continued)

(56) References Cited

U.S. PATENT DOCUMENTS 6,009,407 A    12/1999  Garg
6,055,573 A     4/2000  Gardenshwartz et al.
(Continued)

OTHER PUBLICATIONS

PCT International Search Report, Application No. PCT/US17/13569, dated Apr. 14, 2017, 2 sheets.
(Continued)

*Primary Examiner* — Randy A Flynn
(74) *Attorney, Agent, or Firm* — McDermott Will & Emery LLP; Richard G. A. Bone

(57) ABSTRACT

The current invention relates to a computer-generated method for optimizing placement of advertising content to consumers' TV's using a programmatic TV bidding model. The system can allocate advertising campaigns and plans to various inventory types based on the probability of accurate consumer matching. Consumer matching can be achieved by generation of look-alike models in a consumer's device graph to predict future consumption behavior. The system includes an interface through which an advertiser can access relevant information about inventory and success of a given placement.

27 Claims, 11 Drawing Sheets

Related U.S. Application Data

(60) Provisional application No. 62/196,592, filed on Jul. 24, 2015, provisional application No. 62/264,764, filed on Dec. 8, 2015.

(51) Int. Cl.

| | | |
|---|---|---|
| *H04N 21/25* | (2011.01) | |
| *H04N 21/2547* | (2011.01) | |
| *H04N 21/258* | (2011.01) | |
| *H04N 21/266* | (2011.01) | |
| *H04N 21/45* | (2011.01) | |
| *H04N 21/466* | (2011.01) | |
| *H04N 21/81* | (2011.01) | |
| *G06F 17/18* | (2006.01) | |
| *G06Q 30/02* | (2012.01) | |

(52) U.S. Cl.
CPC ..... *G06Q 30/0264* (2013.01); *G06Q 30/0269* (2013.01); *G06Q 30/0275* (2013.01); *H04N 21/2385* (2013.01); *H04N 21/252* (2013.01); *H04N 21/2547* (2013.01); *H04N 21/25883* (2013.01); *H04N 21/25891* (2013.01); *H04N 21/266* (2013.01); *H04N 21/4532* (2013.01); *H04N 21/4667* (2013.01); *H04N 21/812* (2013.01)

(58) Field of Classification Search
CPC ........... H04N 21/25891; H04N 21/266; H04N 21/4532; H04N 21/4667; H04N 21/812; G06F 17/18; G06Q 30/0251; G06Q 30/0264; G06Q 30/0269; G06Q 30/0275
See application file for complete search history.

(56) References Cited

U.S. PATENT DOCUMENTS

| | | |
|---|---|---|
| 6,061,691 A | 5/2000 | Fox |
| 6,119,101 A | 9/2000 | Peckover |
| 6,253,187 B1 | 6/2001 | Fox |
| 6,298,330 B1 | 10/2001 | Gardenswartz et al. |
| 6,567,824 B2 | 5/2003 | Fox |
| 6,868,389 B1 | 3/2005 | Wilkin et al. |
| 6,895,387 B1 | 5/2005 | Roberts et al. |
| 6,920,464 B2 | 7/2005 | Fox |
| 6,937,996 B1 | 8/2005 | Forsythe et al. |
| 6,993,494 B1 | 1/2006 | Boushy et al. |
| 7,062,510 B1 | 6/2006 | Eldering |
| 7,136,871 B2 | 11/2006 | Ozer et al. |
| 7,158,943 B2 | 1/2007 | van der Riet |
| 7,222,099 B2 | 5/2007 | Forsythe et al. |
| 7,228,287 B1 | 6/2007 | Samson et al. |
| 7,356,547 B2 | 4/2008 | Ozer et al. |
| 7,363,254 B2 | 4/2008 | Skinner |
| 7,423,406 B2 | 9/2008 | Geniusz |
| 7,444,658 B1 | 10/2008 | Matz et al. |
| 7,536,316 B2 | 5/2009 | Ozer et al. |
| 7,548,929 B2 | 6/2009 | Collins et al. |
| 7,574,404 B2 | 8/2009 | Forsythe et al. |
| 7,661,118 B2 | 2/2010 | Matz et al. |
| 7,689,590 B2 | 3/2010 | Fox |
| 7,729,940 B2 | 6/2010 | Harvey et al. |
| 7,761,346 B2 | 7/2010 | Cooper et al. |
| 7,801,778 B2 | 9/2010 | Fox |
| 7,802,280 B2 | 9/2010 | Zigmond et al. |
| 7,831,685 B2 | 11/2010 | Dai et al. |
| 7,835,937 B1 | 11/2010 | Karlsson et al. |
| 7,835,939 B1 | 11/2010 | Karlsson et al. |
| 7,844,492 B2 | 11/2010 | Perkowski et al. |
| 7,870,023 B2 | 1/2011 | Ozer et al. |
| 7,904,327 B2 | 3/2011 | Phelan et al. |
| 7,917,388 B2 | 3/2011 | van der Riet |
| 7,925,549 B2 | 4/2011 | Looney et al. |
| 7,945,474 B1 | 5/2011 | Koinov |
| 7,945,928 B2 | 5/2011 | Matz et al. |
| 7,949,561 B2 | 5/2011 | Briggs |
| 7,949,562 B2 | 5/2011 | Collins |
| 7,949,563 B2 | 5/2011 | Collins |
| 7,974,889 B2 | 7/2011 | Raimbeault |
| 8,000,993 B2 | 8/2011 | Harvey et al. |
| 8,006,261 B1 | 8/2011 | Haberman et al. |
| 8,060,398 B2 | 11/2011 | Canning et al. |
| 8,069,142 B2 | 11/2011 | Davis et al. |
| 8,090,613 B2 | 1/2012 | Kalb et al. |
| 8,099,316 B2 | 1/2012 | Moukas et al. |
| 8,099,317 B2 | 1/2012 | Moukas et al. |
| 8,099,318 B2 | 1/2012 | Moukas et al. |
| 8,099,323 B2 | 1/2012 | Veeraraghavan |
| 8,112,301 B2 | 2/2012 | Harvey et al. |
| 8,117,050 B2 | 2/2012 | Li et al. |
| 8,117,067 B2 | 2/2012 | Ketchum |
| 8,135,626 B2 | 3/2012 | Das et al. |
| 8,180,891 B1 | 3/2012 | Harrison |
| 8,160,916 B2 | 4/2012 | Moukas et al. |
| 8,175,914 B1 | 5/2012 | Benson et al. |
| 8,195,508 B1 | 6/2012 | Calder et al. |
| 8,239,242 B2 | 8/2012 | Moukas et al. |
| 8,249,925 B2 | 8/2012 | Broms et al. |
| 8,255,949 B1 | 8/2012 | Bayer et al. |
| 8,265,996 B2 | 9/2012 | Steelberg et al. |
| 8,296,793 B2 | 10/2012 | Johnson |
| 8,321,273 B2 | 11/2012 | Briggs |
| 8,321,274 B2 | 11/2012 | Collins et al. |
| 8,321,275 B2 | 11/2012 | Collins et al. |
| 8,341,047 B1 | 12/2012 | Furney et al. |
| 8,346,593 B2 | 1/2013 | Fanelli et al. |
| 8,346,607 B1 | 1/2013 | Benson et al. |
| 8,352,307 B2 | 1/2013 | Moukas et al. |
| 8,352,320 B2 | 1/2013 | MacDonald et al. |
| 8,386,310 B2 | 2/2013 | Weyer et al. |
| 8,386,398 B1 | 2/2013 | Hickman |
| 8,392,252 B2 | 3/2013 | Kaufman et al. |
| 8,401,887 B2 | 3/2013 | Moukas et al. |
| 8,402,482 B2 | 3/2013 | Woodward et al. |
| 8,417,556 B2 | 4/2013 | Moukas et al. |
| 8,423,408 B1 | 4/2013 | Barnes et al. |
| 8,442,859 B1 | 5/2013 | Broms et al. |
| 8,473,339 B1 | 6/2013 | McKennon et al. |
| 8,478,675 B1 | 7/2013 | Walia et al. |
| 8,489,460 B2 | 7/2013 | Kamath |
| 8,504,416 B2 | 8/2013 | Calder et al. |
| 8,516,515 B2 | 8/2013 | Zigmond et al. |
| 8,527,341 B2 | 9/2013 | Feuerstein et al. |
| 8,527,342 B2 | 9/2013 | Feuerstein et al. |
| 8,533,048 B2 | 9/2013 | Charania |
| 8,533,049 B2 | 9/2013 | Flake et al. |
| 8,539,067 B2 | 9/2013 | Juda et al. |
| 8,539,072 B1 | 9/2013 | Harrison |
| 8,554,619 B2 | 10/2013 | Juda et al. |
| 8,560,385 B2 | 10/2013 | Atazky et al. |
| 8,566,224 B2 | 10/2013 | Walia et al. |
| 8,566,861 B2 | 10/2013 | Zigmond et al. |
| 8,589,233 B2 | 11/2013 | Flake et al. |
| 8,620,795 B2 | 12/2013 | Veeraraghavan |
| 8,630,902 B2 | 1/2014 | Baum et al. |
| 8,639,567 B2 | 1/2014 | Winters |
| 8,645,186 B2 | 2/2014 | Moukas et al. |
| 8,650,066 B2 | 2/2014 | Shah et al. |
| 8,655,695 B1 | 2/2014 | Qu et al. |
| 8,655,730 B1 | 2/2014 | Swan et al. |
| 8,671,016 B2 | 3/2014 | Little |
| 8,700,452 B1 | 4/2014 | McKennon et al. |
| 8,700,462 B2 | 4/2014 | Collins |
| 8,732,015 B1 | 5/2014 | Beckerman et al. |
| 8,738,433 B2 | 5/2014 | DiOrio et al. |
| 8,738,446 B1 | 5/2014 | L'Heureux et al. |
| 8,744,908 B2 | 6/2014 | Kalb et al. |
| 8,751,359 B2 | 6/2014 | Walia et al. |
| 8,751,418 B1 | 6/2014 | Sutter et al. |
| 8,752,086 B2 | 6/2014 | COnant |
| 8,782,683 B2 | 7/2014 | Balakrishnan et al. |
| 8,788,345 B2 | 7/2014 | Kamath |
| 8,819,249 B2 | 8/2014 | Harrison |

(56) References Cited

U.S. PATENT DOCUMENTS

| | | |
|---|---|---|
| 8,819,255 B1 | 8/2014 | Harrison |
| 8,825,677 B2 | 9/2014 | Gausebeck et al. |
| 8,831,987 B2 | 9/2014 | Knapp et al. |
| 8,904,021 B2 | 12/2014 | Harrison |
| 8,909,771 B2 | 12/2014 | Heath |
| 8,935,721 B2 | 1/2015 | Tidwell et al. |
| 8,949,890 B2 | 2/2015 | Evans et al. |
| 8,972,281 B2 | 3/2015 | Pokonosky |
| 8,983,859 B2 | 3/2015 | Nice et al. |
| 8,990,105 B1 | 3/2015 | Shatkin-Margolis et al. |
| 9,026,886 B1 | 5/2015 | Harrison |
| 9,053,497 B2 | 6/2015 | Benyamin |
| 9,154,942 B2 | 10/2015 | Harrison et al. |
| 9,167,419 B2 | 10/2015 | Harrison |
| 2002/0184047 A1 | 12/2002 | Plotnick et al. |
| 2005/0137958 A1 | 6/2005 | Huber et al. |
| 2006/0190330 A1 | 8/2006 | Tollinger et al. |
| 2006/0217110 A1 | 9/2006 | Othmer et al. |
| 2006/0253328 A1 | 11/2006 | Kohli et al. |
| 2007/0038509 A1 | 2/2007 | Jain et al. |
| 2007/0143186 A1 | 6/2007 | Apple et al. |
| 2007/0169143 A1 | 7/2007 | Li |
| 2007/0198355 A1 | 8/2007 | Samson et al. |
| 2008/0167943 A1 | 7/2008 | O'Neil et al. |
| 2008/0271070 A1 | 10/2008 | Kanojia et al. |
| 2009/0037252 A1 | 2/2009 | Joyce |
| 2009/0091571 A1 | 4/2009 | Zalewski |
| 2009/0150215 A1 | 6/2009 | Kalb et al. |
| 2009/0150224 A1 | 6/2009 | Lu et al. |
| 2009/0171780 A1 | 7/2009 | Aldrey |
| 2009/0172728 A1 | 7/2009 | Shkedi et al. |
| 2009/0248478 A1 | 10/2009 | Duggal et al. |
| 2009/0248680 A1 | 10/2009 | Kalavade et al. |
| 2009/0298480 A1 | 12/2009 | Khambete et al. |
| 2010/0121671 A1 | 5/2010 | Boutilier et al. |
| 2010/0235219 A1 | 9/2010 | Merrick et al. |
| 2010/0250332 A1* | 9/2010 | Ghosh ................ G06Q 30/0242 705/14.41 |
| 2010/0324982 A1 | 12/2010 | Marolli |
| 2011/0035277 A1 | 2/2011 | Kodialam et al. |
| 2011/0040611 A1 | 2/2011 | Simmons et al. |
| 2011/0040612 A1 | 2/2011 | Simmons et al. |
| 2011/0040613 A1 | 2/2011 | Simmons et al. |
| 2011/0040635 A1 | 2/2011 | Simmons et al. |
| 2011/0040636 A1 | 2/2011 | Simmons et al. |
| 2011/0106618 A1 | 5/2011 | Ben-Moshe |
| 2011/0119126 A1 | 5/2011 | Park et al. |
| 2011/0119128 A1 | 5/2011 | Fang et al. |
| 2011/0225037 A1* | 9/2011 | Tunca ................ G06Q 30/0247 705/14.46 |
| 2011/0225604 A1 | 9/2011 | Bova |
| 2011/0231242 A1 | 9/2011 | Dilling et al. |
| 2011/0231243 A1 | 9/2011 | Bhatia et al. |
| 2011/0231245 A1 | 9/2011 | Bhatia et al. |
| 2011/0231246 A1 | 9/2011 | Bhatia et al. |
| 2011/0231253 A1 | 9/2011 | Crawford et al. |
| 2011/0231264 A1 | 9/2011 | Dilling et al. |
| 2011/0238485 A1 | 9/2011 | Haumont et al. |
| 2012/0022937 A1 | 1/2012 | Bhatia et al. |
| 2012/0059713 A1 | 3/2012 | Galas et al. |
| 2012/0089455 A1 | 4/2012 | Belani et al. |
| 2012/0120250 A1 | 5/2012 | Shintani et al. |
| 2012/0158485 A1 | 6/2012 | Ogawa |
| 2012/0158486 A1 | 6/2012 | Ogawa |
| 2012/0158487 A1 | 6/2012 | Ogawa |
| 2012/0191529 A1 | 7/2012 | Lewis et al. |
| 2012/0253928 A1 | 10/2012 | Jackson et al. |
| 2012/0271708 A1 | 10/2012 | Ogawa |
| 2012/0271709 A1 | 10/2012 | Ogawa |
| 2012/0310745 A1 | 12/2012 | Bhatia et al. |
| 2012/0323674 A1 | 12/2012 | Simmons et al. |
| 2013/0054349 A1 | 2/2013 | Ogawa |
| 2013/0124309 A1 | 5/2013 | Traasdahl et al. |
| 2014/0040008 A1 | 2/2014 | Belani et al. |
| 2014/0046777 A1 | 2/2014 | Markey et al. |
| 2014/0058826 A1 | 2/2014 | Ogawa |
| 2014/0095320 A1 | 4/2014 | Sivaramakrishnan et al. |
| 2014/0136338 A1 | 5/2014 | Ringdahl |
| 2014/0157309 A1 | 6/2014 | Small et al. |
| 2014/0278912 A1* | 9/2014 | Hughes ............... G06Q 30/0242 705/14.41 |
| 2014/0278981 A1 | 9/2014 | Mersov et al. |
| 2014/0289017 A1* | 9/2014 | Trenkle ............... G06Q 30/0242 705/7.33 |
| 2014/0289765 A1 | 9/2014 | Kitts et al. |
| 2014/0297400 A1* | 10/2014 | Sandholm .......... G06Q 30/0243 705/14.42 |
| 2015/0025936 A1 | 1/2015 | Garel et al. |
| 2015/0066662 A1 | 3/2015 | Knapp et al. |
| 2015/0088635 A1 | 3/2015 | Maycotte et al. |
| 2015/0112803 A1 | 4/2015 | Heiser, II et al. |
| 2015/0121418 A1 | 4/2015 | Jain et al. |
| 2015/0161186 A1 | 6/2015 | Vemuri |
| 2015/0287097 A1 | 10/2015 | Umeda |
| 2015/0350320 A1 | 12/2015 | Yang et al. |
| 2016/0092933 A1* | 3/2016 | Xu ..................... G06Q 30/0275 705/14.71 |
| 2016/0117718 A1 | 4/2016 | Hood et al. |
| 2016/0119689 A1 | 4/2016 | Hood et al. |
| 2016/0125461 A1 | 5/2016 | Sivaramakrishnan et al. |
| 2017/0034591 A1 | 2/2017 | Ray et al. |
| 2017/0034592 A1 | 2/2017 | Ray et al. |
| 2017/0034593 A1 | 2/2017 | Ray et al. |
| 2017/0099525 A1 | 4/2017 | Ray et al. |
| 2017/0208370 A1 | 7/2017 | Ray et al. |

OTHER PUBLICATIONS

PCT International Search Report, Application No. PCT/US16/43952 dated Oct. 6, 2016, 2 sheets.

PCT International Search Report, Application No. PCT/US16/43954 dated Dec. 12, 2016, 4 sheets.

PCT International Search Report, Application No. PCT/US16/43958 dated Nov. 29, 2016, 4 sheets.

PCT International Search Report, Application No. PCT/US16/43955 dated Nov. 29, 2016, 4 sheets.

PCT International Search Report, Application No. PCT/US17/15870 dated May 19, 2017, 2 sheets.

Non-Final Office Action dated Jun. 15, 2017 from the United States Patent and Trademark Office in U.S. Appl. No. 15/219,259.

Non-Final Office Action dated Jun. 1, 2017 from the United States Patent and Trademark Office in U.S. Appl. No. 15/219,262.

Non-Final Office Action dated Jun. 13, 2017 from the United States Patent and Trademark Office in U.S. Appl. No. 15/219,268.

Non-Final Office Action dated Apr. 19, 2017 from the United States Patent and Trademark Office in U.S. Appl. No. 15/219,264.

Adap.tv Debuts Programmatic TV. Mar. 6, 2014. Wireless News. [retrieved on Sep. 22, 2016]. Retrieved from Proquest Technology Collection: <URL: http://search.proquest.com/docview/1504287899?accountid= 142944>.

Cross-Platform Future in Focus 2016, comScore, Inc., whitepaper, Mar. 2016, available at https://www.comscore.com/Insights/Presentations-and-Whitepapers/2016/2016-US-Cross-Platform-Future-in-Focus (last accessed Jul. 26, 2017).

Cross-Screen Planning WHITEPAPER, TubeMogul, Inc., 2016, available from https://www.tubemogul.com/ (last accessed, Jul. 26, 2017).

Programmatic Advertising Software. TubeMogul, Inc., Jul. 15, 2016, available from https://www.tubemogul.com/tubemogul-software/ (last accessed, Jul. 26, 2017).

How is Ad Inventory like Fruit?, Brightroll, Inc., Jun. 29, 2016, available at https://brightroll.com/insights/how-ad-inventory-fruit (last accessed, Jul. 26, 2017).

Drawbridge Connected Consumer Graph, 2016, available at https://drawbridge.com/c/graph (last accessed, Jul. 26, 2017).

Freewheel Video Monetization Report, 2016, Q2. Available at http://freewheel.tv/freewheel-views/a-peek-inside-the-freewheel-video-monetization-report-q2-2016/ (last accessed, Jul. 26, 2017).

(56) References Cited

OTHER PUBLICATIONS

The Device Graph, Tapad, available at https://www.tapad.com/device-graph, (last accessed, Jul. 26, 2017).
Measuring Cross-Device, The Methodology, Tapad, whitepaper, Mar. 2017, available at https://www.tapad.com/resources/cross-device/measuring-cross-device-the-methodology (last accessed, Jul. 26, 2017).

* cited by examiner

Indexer Wizard

User Input

| AIR DATE | MARKET NAME | CHANNEL NAME | SERIES NAME | FORECASTED AUDIENCE | BID PRICE |
|---|---|---|---|---|---|
| ☐ 12/26/2016 | Charlotte, NC | WCNC | NFL Football | 277,184 | $3,064.27 |
| ☐ 12/25/2016 | Greensboro-High Point-Winston Salem, NC | WXII | NFL Football | 139,819 | $2,053.91 |
| ☐ 12/25/2016 | Charlotte, NC | WCCB-TV | The Big Bang Theory | 86,829 | $820.82 |
| ☐ 11/26/2016 | Greensboro-High Point-Winston Salem, NC | WXII | The Voice | 83,851 | $884.68 |
| ☐ 12/19/2016 | Charlotte, NC | WCCB-TV | The Ellen DeGeneres Show | 24,443 | $891.59 |
| ☐ 12/24/2016 | Charlotte, NC | WCCB-TV | Mike & Molly | 62,061 | $573.75 |
| ☐ 11/26/2016 | Greensboro-High Point-Winston Salem, NC | WXII | Dateline NBC | 42,616 | $361.91 |
| ☐ 12/8/2016 | Charlotte, NC | WCCB-TV | Maury | 20,300 | $552.08 |
| ☐ 11/27/2016 | Charlotte, NC | WCCB-TV | Bones | 20,173 | $28.66 |
| ☐ 12/24/2016 | Charlotte, NC | WCCB-TV | 2 Broken Girls | 59,087 | $358.41 |

PROGRAMMATIC TV ADVERTISING PLACEMENT USING CROSS-SCREEN CONSUMER DATA

CLAIM OF PRIORITY

This application is a continuation-in-part of U.S. application Ser. No. 15/219,262, filed Jul. 25, 2016, which claims the benefit of priority under 35 U.S.C. § 119(e) to U.S. provisional application Ser. Nos. 62/196,592, filed Jul. 24, 2015, and 62/264,764, filed Dec. 8, 2015, all of which are incorporated herein by reference in their entirety.

RELATED APPLICATIONS

This application is related to U.S. patent application Ser. No. 15/219,259, filed Jul. 25, 2016, entitled "TARGETING TV ADVERTISING SLOTS BASED ON CONSUMER ONLINE BEHAVIOR", Ser. No. 15/219,268, filed Jul. 25, 2016, entitled "CROSS-SCREEN MEASUREMENT ACCURACY IN ADVERTISING PERFORMANCE", Ser. No. 15/219,264, filed Jul. 25, 2016, entitled "SEQUENTIAL DELIVERY OF ADVERTISING CONTENT ACROSS MEDIA DEVICES", and to provisional application Ser. Nos. 62/196,618, filed Jul. 24, 2015, 62/196,637, filed Jul. 24, 2015, 62/196,898, filed Jul. 24, 2015, 62/196,560, filed Jul. 24, 2015, 62/278,888, filed Jan. 14, 2016, 62/290,387, filed Feb. 2, 2016, and 62/317,440, filed Apr. 2, 2016, all of which are incorporated herein by reference in their entirety.

TECHNICAL FIELD

The technology described herein generally relates to improving and managing a cross-screen advertising strategy for advertisers, and more particularly relates to a system for targeting advertising content to consumers on TV with a programmatic TV bidding model.

BACKGROUND

Video advertisements are among the most advanced, complicated, and expensive, forms of advertising content. Beyond the costs to produce video content itself, the expense of delivering video content over the broadcast and cable networks remains considerable, in part because television (TV) slots are premium advertising space in today's economy. Furthermore, TV is no longer a monolithic segment of the media market. Consumers can now spread their viewing of video content, particularly premium content, across TV, DVR, and a menagerie of over-the-top and on-demand video services viewed across smart TVs, gaming consoles, and mobile devices, as well as traditional TVs.

In short, TV viewing is transforming to digitally distributed viewing, as audiences watch proportionately less live broadcasting and more in a video on demand (VOD) or streaming video format. Correspondingly, distributors of TV content are looking more and more to harness digital data from TVs themselves to offer more attractive placement options to advertisers.

Adding online consumption to the list of options available to any given consumer, only adds greater complexity to the process of coordinating delivery of video adverts to a relevant segment of the public. This complexity means that the task of optimizing delivery of advertising content today far exceeds what has traditionally been necessary, and what has previously been within the capability of experienced persons. The data needed to fully understand a given consumer is fragmented as each individual and household views more and more media in a disparate fashion by accessing a network of devices.

Nevertheless, for many companies, the analytical work that goes into developing an advertising strategy today still requires manual contributions by human analysts. This is especially the case for low volume purchasers of advertising inventory, and is largely the case for advertising purchases on "linear TV"—TV content that is pre-scheduled (often many weeks or months in advance), as opposed to video-on-demand.

Advertising strategies are also generally fixed, meaning that approaches to advertising strategy are conditioned on certain assumptions that are inflexible and limited to what manual processes are able to achieve. The current state of advertising strategy is analogous to where financial trading was before the creation of financial strategy tools such as E-Trade, which facilitates automated buying, and financial advisors such as Fidelity for investment planning.

In implementing today's advertising strategies, human analysts guide the selection of advertising inventory based on, for example, Excel data tables and other static data management tools. This results in inefficient selection of slots, and delays in responding to market trends. Consumers are not disparate silos of preference based on the device they are using, but the market for advertising treats them that way due to limitations in the available technology tools, most of which are incapable of quickly and accurately integrating disparate data sets. For example, today, TV consumption data exists separately from set top box owner data and TV OEMs. It follows that advertising strategies for TV are planned according to TV-specific criteria, and web and mobile advertising, which include sub categories such as social media, are each planned separately. Across the advertising industry, there are separate entities planning for different media platforms, such as set-top box, phone and desktop. Across the different media there exists disparate data, data systems, and data sources (vendors). Today, these device and media categories remain largely segmented when incorporated into advertising campaign strategies and planning. Nevertheless, the increasing availability of digital TV data, often referred to as "programmatic TV" data, means that advertisers are beginning to be able to be more sophisticated about their purchases of TV ad slots.

Currently, some companies attempt to link together a set of devices related to a particular consumer, but they are not capable of treating the disparate data sources with any reliable level of data integration, or at a scale that is useful to advertisers. Identifying selections of devices by comparing and modeling incomplete user data against that of other similar users within the market segment is a partial solution to this issue, but current methods are not able to create associations at a level of granularity that is reliable or useful.

Today, probabilistic and deterministic methods are not widely utilized to associate mobile and computer devices to a precise audience, or household. One reason such methods are not more widely adopted is because of inefficient processing and pairing of data across different devices. For example, in order to predict consumer purchasing, viewing, and advertising interaction habits at a 1:1 level of an association between a user and their respective device, it is insufficient to assume that any single instance of device access is representative of that user's purchasing intent. This is due to modern day habits of media consumption—users consume media on a large variety of devices as well as via different media (such as Hulu, Netflix, or cable television).

As such, a much more complex analysis that enables insight into the intersection of media consumption and a user's family of devices is necessary.

Another reason probabilistic and deterministic methods are not more readily available to gauge consumer purchasing habits is because access to user device data is not easily achieved. For example, under consumer privacy laws, it is unlawful to access a user's device without their explicit consent. Therefore, on a mass scale, it is often unknown what combination of devices a demographic of users use, and what media they consumed on their respective devices. This poses a large challenge for advertisers when determining which advertising inventory to purchase and how best to reach their target audience efficiently on a given category of device, in particular the TVs they watch.

Today, the data systems that track consumer information for use in advertising targeting lack the ability to broadly combine and integrate transmutable and non-transmutable categories (i.e., requiring the integration of a plurality of membrane levels) of consumer data. Most data systems contain static, one-dimensional, homogeneous classifications of consumers. For example, a 29-year old who bought a car two years ago will be a consumer data point that will not adjust or be updated over time. While adjusting the age of this individual over time is simple, other transmutable characteristics such as desire to get married, pregnancy, or other lifestyle changes are not easy to assess or predict. This translates to an inefficiency of advertising placement, and also means that even if an advertiser can target online content to that consumer, their ability to reach them on the TVs they view is severely restricted.

Accordingly, there is a need for a method of integrating and connecting data on a given consumer that is acquired over time from multiple different devices, and to use that integrated data in making reliable placement of advertising content across multiple devices, in particular for TV advertisement slots.

The discussion of the background herein is included to explain the context of the technology. This is not to be taken as an admission that any of the material referred to was published, known, or part of the common general knowledge as at the priority date of any of the claims found appended hereto.

Throughout the description and claims of the application the word "comprise" and variations thereof, such as "comprising" and "comprises", is not intended to exclude other additives, components, integers or steps.

SUMMARY

The instant disclosure addresses the processing of consumer and advertising inventory in connection with optimizing placement of advertising content across display devices, in particular in a programmatic TV environment. The disclosure comprises methods for doing the same, carried out by a computer or network of computers. The disclosure further comprises a computing apparatus for performing the methods, and computer readable media having instructions for the same. The apparatus and process of the present disclosure are particularly applicable to video content in online and TV media.

In overview, the present method allows an advertiser to bid on TV slots based on a probability of matching to an audience category or type. In particular, the present technology relates to systems and methods for optimizing advertising campaigns via programmatic TV bidding processes. The methods herein lend themselves to increasing return on investment of money spent on advertising by increasing efficiency and reducing costs associated with identifying an advertising strategy.

The systems can operate at high-frequency, such as running from 10,000 to 100,000 queries of audience impressions per second. The queries can be dynamic, and in real-time.

In an alternative embodiment, the system develops an advertising strategy designed around specified campaign (end-user) parameters. The strategy is directed to advertising occurring on TV, particularly using programmatic TV bidding methods.

The method involves analyzing consumer, media and related data, from an unlimited number of data inputs, including but not limited to: behavioral such as specific viewing and purchasing histories of individual consumers, as well as demographic, and location-related sources.

The present technology includes programmatic generation of look-alike models in a consumer's device graph to predict future consumption behavior. The method integrates actual content consumption behavior with broadcasted user segments, as well as assigning the devices used for consumption to a single consumer.

The present disclosure provides for a method for targeting delivery of advertising content to a population of consumers across one or more slots in television programming, the method comprising: receiving a pricepoint and one or more campaign descriptions from an advertiser, wherein each of the campaign descriptions comprises a schedule for delivery of an item of advertising content across one or more televisions accessed by a consumer in the population of consumers, and a target audience, wherein the target audience is defined by one or more demographic factors; defining a pool of consumers based on a graph of consumer properties, wherein the graph contains information about two or more TV and mobile devices used by each consumer, demographic and online behavioral data on each consumer, and similarities between pairs of consumers, and wherein the pool of consumers comprises consumers having at least a threshold similarity to a member of the target audience; receiving a list of inventory from one or more content providers, wherein the list of inventory comprises one or more TV slots; identifying one or more advertising targets, wherein each of the one or more advertising targets comprises one or more TV slots that are to be delivered within TV content identified as likely to be viewed by the pool of consumers, consistent with one or more of the campaign descriptions, and an overall cost consistent with the pricepoint; bidding on one or more of the TV slots in an advertising target; and if the bidding results in a success or a hold, instructing a media conduit to deliver the item of advertising content within the one or more TV slots to a consumer in the population of consumers on a television.

The present disclosure further provides for computer readable media, encoded with instructions for carrying out methods described herein and for processing by one or more suitably configured computer processors.

The present disclosure additionally includes a computing apparatus configured to execute instructions, such as stored on a computer readable medium, for carrying out methods described herein.

BRIEF DESCRIPTION OF THE DRAWINGS

FIGS. 8A, 8B show an exemplary computer interface for an embodiment.

Like reference symbols in the various drawings indicate like elements.

DETAILED DESCRIPTION

The instant technology is directed to computer-implemented methods that combine actual content consumption behavior, segments of the consumer population, and an assignment of the devices used for media consumption, in order to assist in optimal placement of programmatic TV advertising content. The methods provide utility for advertisers, content owners, brand managers, data platforms, buying platforms, market research companies, wireless carriers, TV manufacturers, pay-TV operators, TV broadcasters, and the like.

Advertising Functions

Figure 1:
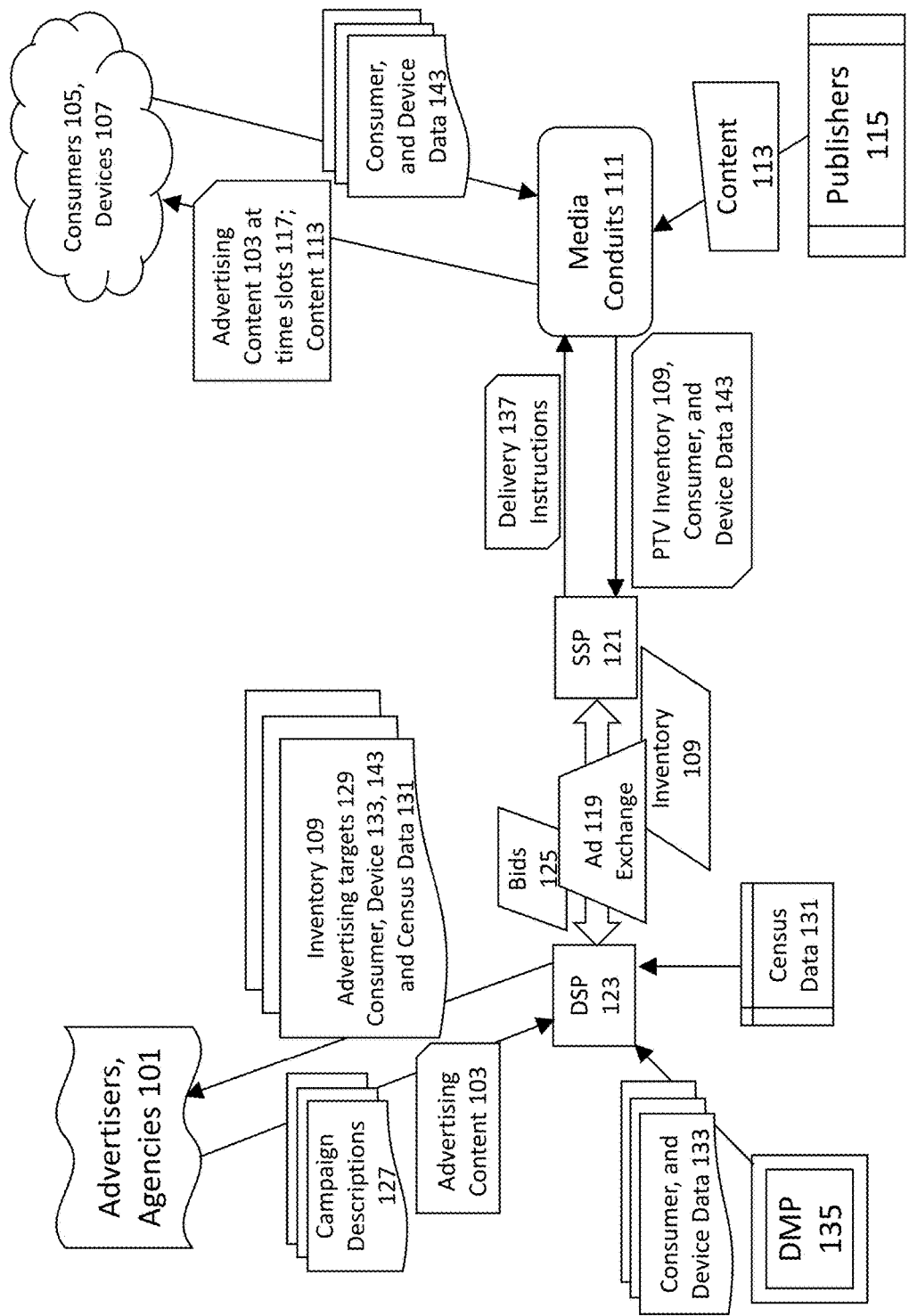
FIG. 1 shows, diagrammatically, relationships between parties that contribute to delivery of advertising content, such as advertisers, an advertising exchange, media conduits, and consumers.

Relationships between entities in the business of purchase, delivery and consumption of advertising content are depicted in FIG. 1. As can be seen, the advertising ecosystem is complex, involves many different entities, and many different relationships.

An advertiser 101 is a purchaser of advertising inventory 109. An advertiser may be a corporation that exercises direct control over its advertising functions, or it may be an agency that manages advertising requirements of one or more clients, usually corporate entities. The advertiser intends to make advertising content 103 (also an "advertisement" herein) available to one or more, typically a population of, consumers 105, on one or more devices 107 per consumer, including at least one TV. Creators of advertising content are not shown in FIG. 1, and may contract separately with advertisers or their agencies 101.

Devices include, for a given consumer, one or more of: TV's (including SmartTV's, or web-enabled TV's), mobile devices (cell phones, smartphones, media players, tablets, notebook computers, laptop computers, and wearables), desktop computers, networked photo frames, set top boxes, gaming consoles, streaming devices, and devices considered to function within the "Internet of Things" such as domestic appliances (fridges, etc.), and other networked in-home monitoring devices such as thermostats and alarm systems. The TV's available include at least one TV that is able to offer programmatic TV data, as further described herein.

The advertising content 103 has typically been created by the advertiser 101 or a third party with whom the advertiser has contracted, and normally includes video, audio, and/or still images that seek to promote sales or consumer awareness of a particular product or service. Advertising content 103 is typically delivered to consumers 105 via one or more intermediary parties, as further described herein.

Advertising content is typically of two different types: branding, and direct-response marketing. The timeframe is different for these two types. Branding promotes awareness; direct response marketing is designed to generate an immediate response. For example, an automobile manufacturer may put out direct response marketing material into the market place, and wants to measure responses by who went to a dealership or website after seeing an advertisement. The methods herein can be applied to both types of advertising content, but the measurement of effectiveness is different for the two types: for example, effectiveness of branding is measured by GRP's (further described elsewhere herein), and results of direct response marketing can be measured by, for example, website visits in the wake of the display of a particular advertisement.

When delivered to a mobile device such as a phone or a tablet, advertising content 103 may additionally or alternatively take the form of a text/SMS message, an e-mail, or a notification such as an alert, a banner, or a badge. When delivered to a desktop computer or a laptop computer or a tablet, the advertising content 103 may display as a pop-up within an app or a browser window, or may be a video designed to be played while other requested video content is downloading or buffering. When delivered to a TV, advertising content 103 is typically in video format, in whole or in part.

Consumers 105 are viewers and potential viewers of the advertising content 103 and may have previously purchased the product or service that is being advertised, and may—advantageously to the advertiser—be learning of the product or service for the first time when they view the advertising content 103.

Advertising inventory 109 (also inventory or available inventory, herein) comprises available slots, or time slots 117 (also referred to herein as a spot), for advertising across the several media interfaces, or conduits 111, through which consumers access information and advertising content. Such media interfaces include TV (including linear and programmatic TV, as further described herein), radio, social media (for example, online networks, such as LinkediN, Twitter, Facebook), digital bill boards, mobile apps, and the like. Media conduits 111 may generate their own content 113, or may be broadcasting content from one or more other content providers or publishers 115. For example, a cable company is a media conduit that delivers content from numerous TV channel producers and publishers of content. Media interfaces may also be referred to as content providers, generally, because they deliver media content 113 (TV programs, movies, etc.) to consumers 105. One aspect of the technology herein includes the ability to bid on programmatic TV inventory in order to deliver advertising content to a particular demographic of TV viewers at particularly favorable time slots. Media conduits 111 also deliver advertising content 103 that has been purchased for delivery at time slots 117, to consumers 105 for viewing on various devices 107. A publisher 115 is typically a content owner (e.g., BBC, ESPN).

A slot 117 is a time, typically expressed as a window of time (1 minute, 2 minutes, etc.) at a particular time of day (noon, 4:30 pm, etc., or a window such as 2-4 pm, or 9 pm -12 am), or during a specified broadcast such as a TV program, on a particular broadcast channel (such as a TV station, or a social media feed). A slot may also be defined by broader categories used by the TV industry such as the daypart (breakfast, daytime, prime time, late night, or overnight). A slot may be further defined by a region of broadcast, such as a DMA (designated market area). An available slot is a slot in the inventory that an advertiser may purchase for the purpose of delivering advertising content. Typically it is available because another advertiser has not yet purchased it. The term slot may be used interchangeably with spot, herein.

As further described herein, a slot may additionally be defined by certain constraints such as whether a particular type of advertising content 103 can be delivered in a particular slot. For example, a sports equipment manufacturer may have purchased a particular slot, defined by a particular time of day on a particular channel, and may have also purchased the right to exclude other sports equipment manufacturers from purchasing slots on the same channel within a certain boundary—in time—of the first manufacturer's slot. In this context, a "hard constraint" is a legal or otherwise mandatory limitation on placing advertising in particular time slots or within specified media. A "soft constraint" refers to desired (non-mandatory) limitations on placing advertising in particular time slots within specified media. "Constraint satisfaction" refers to the process of finding a solution to a set of constraints that impose conditions that the variables must satisfy. The solution therefore is a set of values for the variables that satisfies all constraints.

Information is intended to mean, broadly, any content that a consumer can view, read, listen to, or any combination of the same, and which is made available on a screen such as a TV screen, computer screen, or display of a mobile device such as a tablet, smart-phone, or laptop/notebook computer, a wearable such as a smart-watch, fitness monitor, or an in-car or in-plane display screen. Information is provided by a media interface 111 such as a TV or radio station, a multi-channel video programming distributor (MVPD, such as a cable TV provider, e.g., Comcast), or an online network such as Yahoo! or Facebook.

The communication between the advertisers and the media conduits can be managed by up to several entities, including: a demand-side provider (DSP) 123, an advertising exchange 119, and a supply-side provider 121. An advertising exchange 119 (also, exchange herein) is an environment in which advertisers can bid on available media inventory, which can include TV as well as mobile devices. The TV inventory of interest herein may be digital such as programmatic TV, or may be analog, such as via a TV channel such as ESPN, CNN, Fox, or BBC, or an FM/AM radio broadcast. An advertising exchange 119 typically specializes in certain kinds of content. For example, SpotX specializes in digital content, whereas WideOrbit specializes in programmatic TV.

Supply-side provider (SSP) 121 is an intermediary that takes inventory 109 from a media conduit 111, and makes it available to a demand-side provider (DSP) 123, optionally via exchange 119, so that advertisers can purchase or bid on the inventory when deciding how to position advertising content 103. SSP's have sometimes been categorized as public or private depending on whether a media conduit is able to limit the identity and number of advertisers who have access to the inventory. In some situations, an SSP interacts directly with a DSP without the need for an advertising exchange; this is true if the functions of an advertising exchange that a purchaser of advertising content relies on are performed by one or both of the DSP and SSP. The technology herein is particularly suited for being implemented and being carried out by a suitably-configured DSP and assists in its purchase of advertising via programmatic TV content.

In one configuration, an advertising exchange 119 interfaces between a supply side provider (SSP) 121 and a demand side provider (DSP) 123. The interfacing role comprises receiving inventory 109 from one or more SSP's 121 and making it available to the DSP, then receiving bids 125 on that inventory from the DSP and providing those bids 125 to the SSP. Thus, a DSP makes it possible for an advertiser to bid on inventory provided by a particular SSP such as SPotX, or WideOrbit. In some configurations, the DSP takes on most or all of the role of an advertising exchange.

An advertising campaign (or campaign) is a plan, by an advertiser, to deliver advertising content to a particular population of consumers. A campaign will typically include a selection of advertising content (such as a particular advertisement or various forms of an advertisement, or a sequence of related advertisements intended to be viewed in a particular order), as well as a period of time for which the campaign is to run (such as 1 week, 1 month, 3 months). An advertiser typically transmits a campaign description 127 to an advertising exchange 119 or a DSP 121, and in return receives a list of the inventory 109 available. A campaign description 127 may comprise a single item of advertising content 103 and one or more categories of device 107 to target, or may comprise a schedule for sequential delivery of two or more items of advertising content 103 across one or more devices 107. A campaign description 127 may also comprise a description of a target audience, wherein the target audience is defined by one or more demographic factors selected from, but not limited to: age range, gender, income, and location.

The DSP 123 then provides an interface by which the advertiser 101 can align its campaign descriptions 127 against inventory 109 and purchase, or bid on, various slots 117 in the inventory. The DSP 123, or an exchange 119, may be able to provide more than one set of inventory that matches a given campaign description 127: each set of inventory that matches a given campaign description is referred to herein as an advertising target 129. The advertiser 101 may select from among a list of advertising targets, the target or targets that it wishes to purchase. Once it has purchased a particular target, the SSP 121 is notified and delivery instructions 137 are sent to the various media conduits 111 so that the advertising content 103 can be delivered in the applicable time slots 117, or during selected content 113, to the relevant consumers.

When seeking programmatic TV content, a purchase of a given slot is not simply a straightforward sale at a given price, but is achieved via a bidding process. The DSP will place bids on a number of slots, and for each one, will have identified a bid price that is submitted to the SSP. For a winning bid, the SSP delivers the advertising content to the media conduit, and ultimately the consumer. Bids are generally higher for specific targeting than for blanket targeting.

The bidding process depends in part on the type of advertising content. TV content can be scheduled in advance, whereas for online content, the typical bid structure is 'just-in-time' bidding: the advert is delivered only if a particular consumer is seen online. In general, the methods herein are tailored to programmatic TV bidding processes, and are applicable to any of the bidding methods that may be deployed, and that exploits details of programmatic TV data.

The process of generating advertising targets may also depend one or more campaign requirements. A campaign requirement, as used herein, refers to financial constraints such as a budget, and performance specifications such as a number of consumers to target, set by an advertiser or other purchaser of advertising inventory. Campaign requirement information is used along with campaign descriptions when purchasing or bidding on inventory.

DSP's 123 also provide advertisers 101 with data on consumers and devices, aggregated from various sources. This data helps an advertiser choose those time slots and media conduits from the inventory that will best suit its goals.

Data used by DSP's may include census data 131, or data on specific consumers and devices 133. Census data 131 includes data on a population that can be used to optimize purchase of inventory. Census data 131 can therefore include demographic data such as age distribution, income variations, and marital status, among a population in a particular viewing region independent of what media interfaces the members of the population actually view. Census data 131 can be aggregated from a variety of sources, such as state and county records, and U.S. Census Bureau data.

A data management platform (DMP) 135 can provide other types of third party data 133 regarding consumers and the devices they use to the DSP. Typically a DMP provides a data warehousing facilities with embedded functionality. DMPs download data and can perform a variety of analytical functions ranging from sorting, storing, processing, applying matching algorithms, and providing data outputs to purchasers and subscribers. Examples of DMP's include: Krux, Exelate, Nielsen, Lotame. The consumer and device data 133 that is delivered to a DSP from a third party provider may complement other consumer and device data 143 that is provided by the media conduits. Data on consumers and the devices they use that is relevant to an advertiser includes matters of viewing habits as well as specific behavioral data that can be retrieved directly from a media conduit. For example, as further discussed elsewhere herein, when a media conduit serves an advertisement to a consumer, the conduit can collect information on that user's manner of access to the advert. Due to the volume of data involved, after a relatively short period of time, such as 14 days, a media conduit may not be able to furnish any information on a particular consumer. In that instance, the DSP can get data on that user from a third party such as a DMP. Third parties can get data offline as well. As used herein, an offline event is one that happens independently of the Internet or a TV view: for example, it can include purchase of an item from a store and other types of location-based events that an advertiser can view as significant. Data can be shared between the entities herein (e.g., between a DMP and a DSP, and between DSP and SSP, and between media conduits and a SSP or advertising exchange) using any commonly accepted file formats for sharing and transfer of data: these formats include, but are not limited to: JSON, CSV, and Thrift, as well as any manner of text file appropriately formatted.

An impression refers to any instance in which an advertisement reaches a consumer. On a TV, it is assumed that if the TV is broadcasting the advertisement then an individual known to be the owner of, or a regular viewer of, that TV will have been exposed to the advertisement, and that display counts as an impression. If multiple persons are in the same household then the number of impressions may equal the number of persons who can view that TV. In the online environment, an impression occurs if a consumer is viewing, say, a web-page and the advertisement is displayed on that web-page such as in the form of a pop-up, or if the user has clicked on a link which causes the advertisement to run.

An audience segment is a list of consumers, de-identified from their personally identifiable information using cookie syncing or other methods, where the consumers belong to a type (income, gender, geographic location, etc.), or are associated with a behavior: purchases, TV viewership, site visits, etc.

Cookie syncing refers to a process that allows data exchange between DMP's SSP's and DSP's, and more generally between publishers of content and advertisement buyers. A cookie is a file that a mobile device or desktop computer uses to retain and restore information about a particular user or device. The information in a cookie is typically protected so that only an entity that created the cookie can subsequently retrieve the information from it. Cookie syncing is a way in which one entity can obtain information about a consumer from the cookie created by another entity, without necessarily obtaining the exact identify of the consumer. Thus, given information about a particular consumer received from a media conduit, through cookie syncing it is possible to add further information about that consumer from a DMP.

For mobile devices, there is a device ID, unique to a particular device. For TV's there is a hashed IP address. The device ID information may be used to link a group f devices to a particular consumer, as well as link a number of consumers, for example in a given household, to a particular device. A DSP may gather a store of data, built up over time, in conjunction with mobile device ID's and TV addresses that augment 'cookie' data.

Cross-screen refers generally to analysis of media, consumer, and device data that combines viewer data across multiple devices. Cross-screen encompasses distribution of media data, including advertising content, across multiple devices of a given consumer, such as a TV screen, computer screen, or display of a mobile device such as a tablet, smart-phone or laptop/notebook computer, a wearable such as a smart-watch or fitness monitor, or an in-car, or in-plane display screen, or a display on a networked domestic appliance such as a refrigerator.

Reach is the total number of different people exposed to an advertisement, at least once, during a given period.

In a cross-screen advertising or media campaign, the same consumer can be exposed to an advertisement multiple times, through different devices (such as TV, desktop or mobile) that the consumer uses. Deduplicated reach is the number of different people exposed to an advertisement irrespective of the device. For example, if a particular consumer has seen an advertisement on his/her TV, desktop and one or more mobile devices, that consumer only contributes 1 to the reach.

The incremental reach is the additional deduplicated reach for a campaign, over and above the reach achieved before starting the campaign, such as from a prior campaign. In one embodiment herein, a type of campaign can include a TV extension: in this circumstance, an advertiser has already run a campaign on TV, but is reaching a point of diminished returns. The advertiser wants to find ways to modify the campaign plan for a digital market, in order to increase the reach. In this way, a DSP may inherit a campaign that has already run its course on one or more media conduits.

VOD refers to video on demand systems, which allow users to select and watch or listen to video or audio content when they choose to, rather than having to watch content at a scheduled broadcast time. Internet technology is often used to bring video on demand to televisions and personal computers. Television VOD systems can either stream content through a set-top box, a computer or other device, allowing viewing in real time, or download it to a device such as a computer, digital video recorder (also called a personal video recorder) or portable media player for viewing at any time.

The term "Programmatic TV" (PTV) is used widely in the industry, and can refer to a number of different types of automated methods of bidding for, and positioning, advertisements within, TV content. The advertisements include digital TV advertisements delivered online to connected TVs, as well as linear TV ads delivered via set-top boxes. Programmatic TV technology typically relies on access to consumer data of varying types, including but not limited to IP address data and TV viewing data that can be associated with a particular demographic or even an individual consumer. As described herein, methods of bidding on PTV data can rely on data on consumers that has been gathered from other devices, i.e., cross-screen data.

The bidding on PTV content is an important aspect of its operation because it permits dynamic, or close-to-dynamic, bidding in an environment that has traditionally been restricted to arrangements for pre-purchasing slots (such as 1-2 weeks in advance). PTV introduces the possibility of an automated bidding process into the purchase of inventory, in particular one in which the price of inventory can be automatically determined.

One category of demographic data for PTV is "one on one" when it is possible to associate a given consumer with a particular TV (such data may be available from companies such as Vizio). A second category of demographic data for PTV includes a group of persons, such as 25 or more persons, in a defined cluster from which it is not possible to identify a given individual or household but such that the cluster is sufficiently well-defined that an advertiser would wish to target advertising content to them. For example, the demographic may be defined by a combination of age, income, location, and a specific recent shopping experience. A third category of demographic is less specific but is easy for an MVPD to target: for example it may be defined geographically such as by a zip code. Still other demographic data may be expressed at a higher level by region, such as national, or by DMA.

The term PTV may also be used interchangeably with other terms such as "addressable TV" (wherein an MVPD can tailor content to a specific TV, associated with a known consumer), "TV-on-demand", and "over the top" TV, as further described herein. In some contexts, other specific delivery vehicles such as "Apple TV" can encompass elements of PTV. The interchangeability of such terms arises from an ability to target advertising content in a specific manner, by using a bidding process.

PTV is important because it shortens the time for realizing the result of a bid: a purchaser of advertising inventory will know very quickly whether a bid on PTV delivered content was successful, even where the slot in question is not for several days or a week into the future. Conversely, PTV also provides a greater period of time by which to bid ahead on content, in the sense that it makes it possible for an advertiser to continue to bid till much closer to the time that a program will air than previously. In this way, it gives an advertiser an opportunity to bid on unsold inventory even when it is close to the broadcast time.

In addition to TV programming content, and online content delivered to desktop computers and mobile devices, advertisements may be delivered within OTT content. OTT (which derives from the term "over the top") refers to the delivery of audio, and video, over the Internet without the involvement of a MVPD in the control or distribution of the content. Thus, OTT content is anything not tied to particular box or device. For example, Netflix, or HBO-Go, deliver OTT content because a consumer doesn't need a specific device to view the content. By contrast, MVPD content such as delivered to a cable or set top box is controlled by a cable or satellite provider such as Comcast, AT&T or DirectTV, and is not described as OTT. OTT in particular refers to content that arrives from a third party, such as Sling TV, YuppTV, Amazon Instant Video, Mobibase, Dramatize, Presto, DramaFever, Crackle, HBO, Hulu, myTV, Netflix, Now TV, Qello, RPI TV, Viewster, WhereverTV, Crunchyroll or WWE Network, and is delivered to an end-user device, leaving the Internet service provider (ISP) with only the role of transporting IP packets. OTT delivered content is important because of the feedback data that it provides, which in turn can be used to refine information about consumer demographics.

Furthermore, an OTT device is any device that is connected to the internet and that can access a multitude of content. For example, Xbox, Roku, Tivo, Hulu (and other devices that can run on top of cable), a desktop computer, and a smart TV, are examples of OTT devices.

Gross rating point (GRP) refers to the size of an advertising campaign according to schedule and media conduits involved, and is given by the number of impressions per member of the target audience, expressed as a percentage (GRP can therefore be a number >100. For example, if an advert reaches 30% of the population of L.A. 4 times, the GRP is 120. (The data may be measured by, e.g., a Nielsen panel of say 1,000 viewers in L.A.).

The target rating point (TRP) refers to the number of impressions per target audience member, based on a sample population. This number relates to individuals: e.g., within L.A. the advertiser wants to target males, 25 and older. If there are 100 such persons in the L.A. panel and 70% saw the ad., then the TRP is 70%×number of views.

"High frequency" refers to high frequency trading related to advertising purchases and sales. The methods and technology herein can be practiced by trading platforms for advertising that utilize computers to transact a large number of bid requests for advertising inventory at high speeds.

Consumer Data

Data about consumers can be categorized into two groups: there are non-transmutable characteristics such as ethnicity, and gender; and there are transmutable characteristics such as age, profession, address, marital status, income, taste and preferences. Various transmutable characteristics such as profession are subject to change at any time, while others such as age change at a consistence rate. Today, the data systems that track consumer information for use in targeting advertising content lack the ability to broadly track both categories of consumer data. Most data systems contain static, homogenous classifications of consumers. For example, a 29-year old who bought a car two years ago will be a consumer data point that will not be updated or augmented with time. Even if the age of the individual as stored in a system can be adjusted with time, other transmutable characteristics such as change in marital state, or lifestyle changes, are not taken into account in this consumer's classification.

At various stages of the methods herein, it is described that each consumer in a population of consumers is treated in a particular way by the method: for example, a computer may be programmed to analyze data on each consumer in its database in order to ascertain which, if any, have viewed a particular TV show, or visited a particular website; alternatively, some comparative analysis may be performed, in which attributes of each user in one category of population is compared with attributes of each consumer in another category of population. Each population set may comprise many thousands of individuals, or many hundreds of thousands, or even millions or many millions of individuals. It is assumed herein that the methods, when deployed on suitable computing resources, are capable of carrying out stated calculations and manipulations on each and every member of the populations in question. However, it is also consistent with the methods herein that "each consumer" in a population may also mean most consumers in the population, or all consumers in the population for whom the stated calculation is feasible. For example, where one or more given consumers in a population is omitted from a particular calculation because there is insufficient data on the individual, that does not mean that an insufficient number of members of the population is analyzed in order to provide a meaningful outcome of the calculation. Thus "each" when referencing a population of potentially millions of consumers does not necessarily mean exactly every member of the population but may mean a large and practically reasonable number of members of the population, which for the purposes of a given calculation is sufficient to produce a result.

Consumer Graph

A consumer graph is a graph in which each node represents a consumer (or individual user). The technology utilizes various implementations of a weighted graph representation in which relationships between consumers (nodes) are defined as degrees of similarity (edges). A consumer graph is used herein to categorize, store, and aggregate large amounts of consumer data, and allow an entity such as a DSP to make connections between data used to build a consumer graph with other data—such as TV viewing data—via data on given consumers' devices. The consumer graph is based on cross-screen data and can be used to identify a population of consumers to which programmatic TV advertising content is to be targeted.

One way to construct the graph is by using deterministic relationship data; another is probabilistically using the attributes of each node. In some instances, a combination of deterministic and probabilistic methods can be used. In a deterministic, approach, which is relatively straightforward, the basis is having exact data on a consumer, such as login information from a publisher. Thus, if a person has logged in multiple times on different devices with the same ID, then it is possible to be sure that the person's identity is matched. However, such exact information may not always be available. By contrast, in a probabilistic approach, it is necessary to draw inferences: for example, if the same device is seen in the same location, or similar behavior can be attributed to a given device at different times, then it possible to conclude that the device belongs to the same user.

In some embodiments herein, machine learning methods, and Bayesian and regression algorithms, are used to explore commonalities between consumers. Such methods are useful in situations where there is a finite number of parameters to be considered. In some other embodiments, techniques of deep learning are more useful in finding consumer similarities and constructing a consumer graph. Machine learning is a preferred technique for matching exact pieces of information, for example whether the same websites have been visited by two consumers, but deep learning can explore the details of a particular video or TV program—for example, by analyzing natural scene statistics—and thereby ascertain, for example, whether two adverts that were viewed by a given consumer have something in common beyond their subject matter. For example, two adverts may include the same actor and be liked by a consumer for that reason, even though the products portrayed have little in common.

In preferred embodiments, the device graph herein is based on probabilistic data. The probabilistic approach to graph construction uses behavioral data such as viewership habits to match up users.

In some embodiments, an entity such as a DSP, can construct a device graph; in other embodiments it can obtain, such as purchase, it from another entity such as a DMP.

In various embodiments herein, both a device graph and a consumer graph are operating together in a manner that permits tying in mobile data to TV data, and therefore facilitates the bidding process on PTV inventory.

Figure 2:
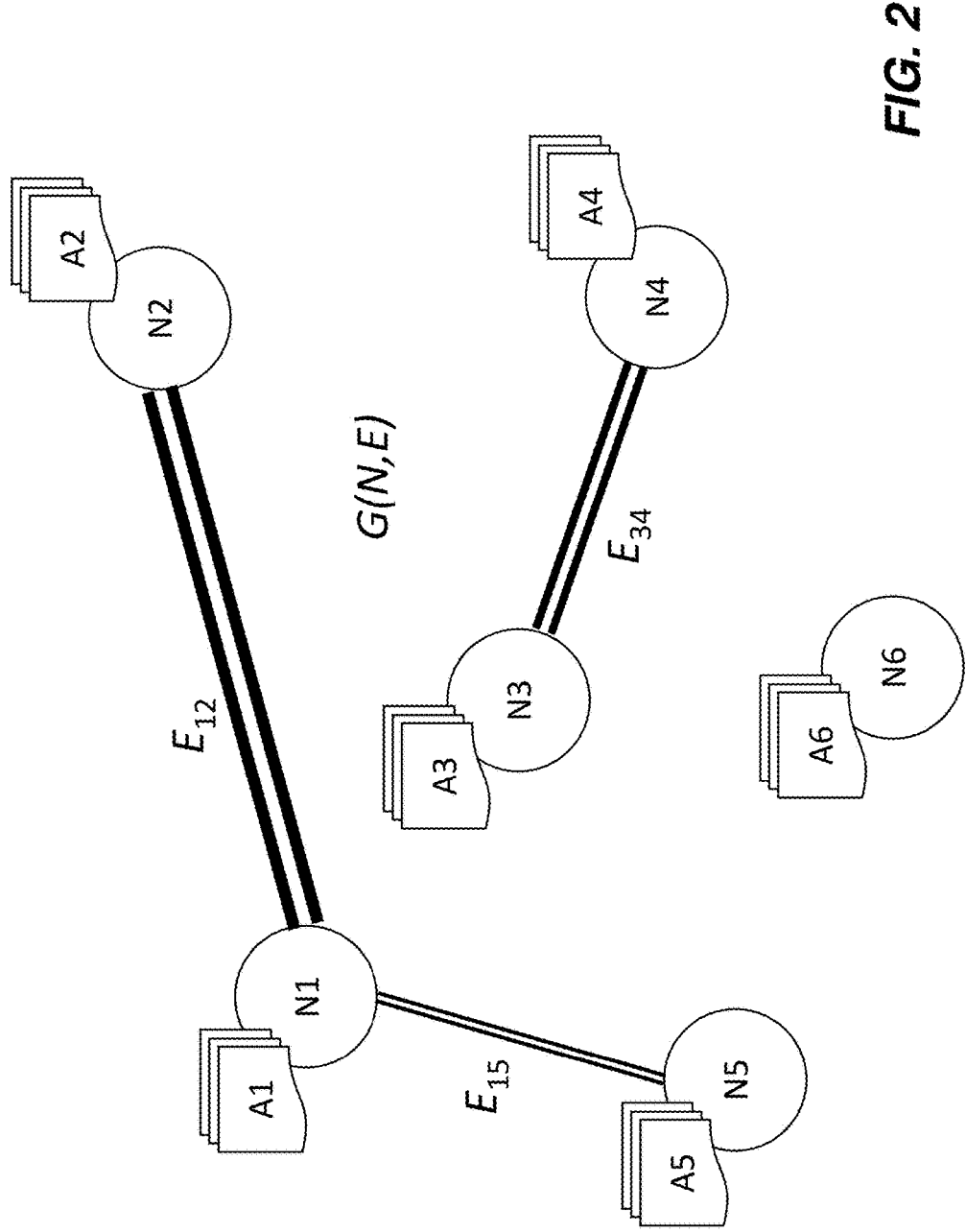
FIG. 2 shows a consumer graph.

The term graph is used herein in its mathematical sense, as a set G(N, E) of nodes (N) and edges (E) connecting pairs of nodes. Graph G is a representation of the relationships between the nodes: two nodes that are connected by an edge are similar to one another according to some criterion, and the weight of an edge defines the strength of the similarity. Pairs of nodes that do not meet the similarity criterion are not joined by an edge. FIG. 2 illustrates graph concepts, showing 6 nodes, $N_1$-$N_6$, in which three pairs of nodes are connected by edges.

In the implementation of a graph herein, a node, N, is an entity or object with a collection of attributes, A. In FIG. 2, each node has associated with it an array of attributes, denoted Ai for node Ni.

In the implementation of a graph herein, an edge, E, existing between two nodes indicates the existence of a relationship, or level of similarity, between the two nodes that is above a defined threshold. The weight of an edge, w_E, is the degree of similarity of the two nodes. The weights of the edges in FIG. 2 are shown diagrammatically as thicknesses (in which case, $w\_E_{12} > w\_E_{34} > w\_E_{15}$).

In a consumer graph, a node represents an individual, or a household comprising two or more individuals, with a set of attributes such as the gender(s) and age(s) of the individual(s), history of TV programs watched, web-sites visited, etc.

Figure 3:
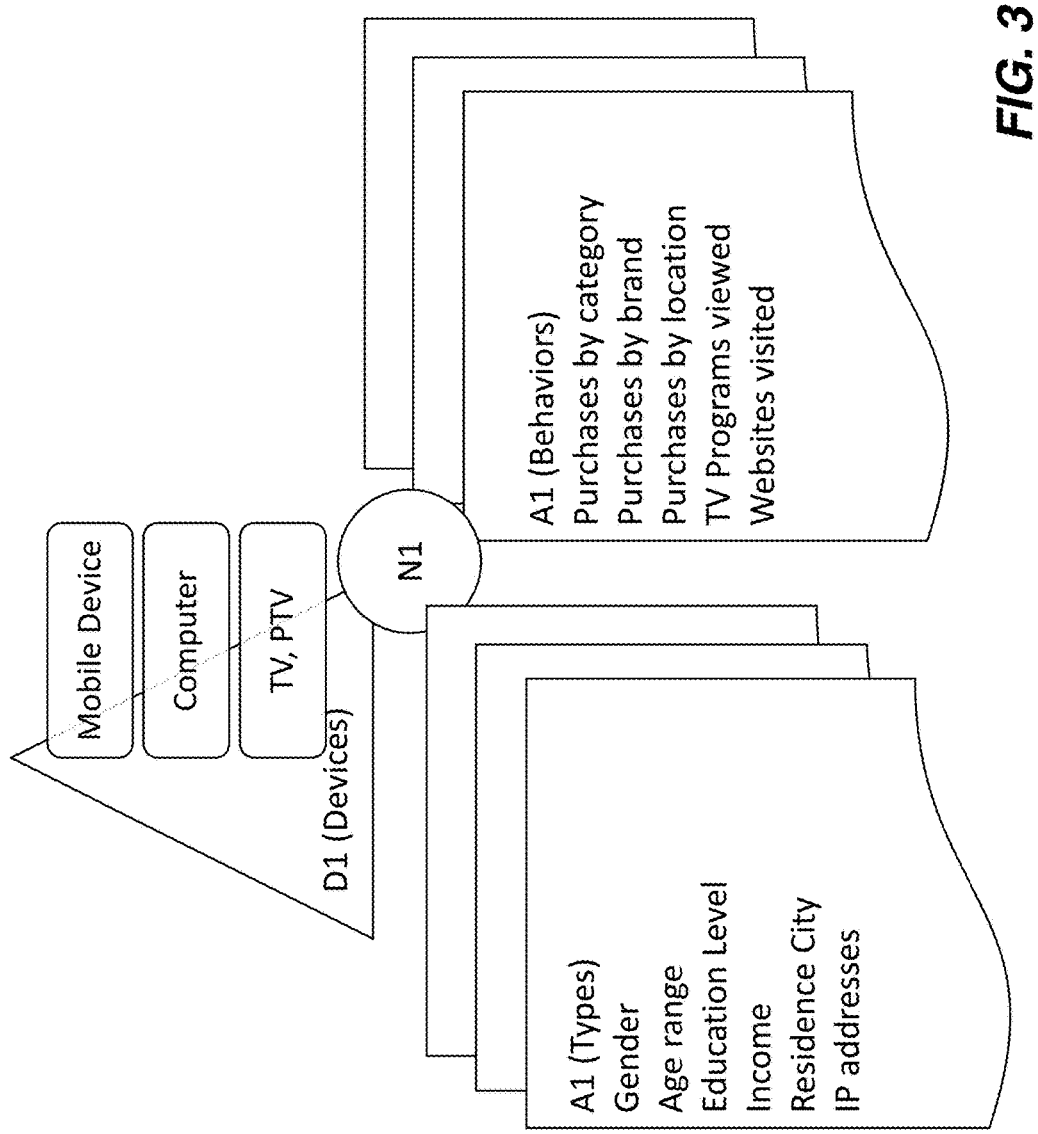
FIG. 3 shows a node in a graph.

FIG. 3 illustrates an exemplary structure of a node of a consumer graph. Each node has a collection of attributes that include types and behaviors, for which data is continuously collected from first party and third party sources. Many of the attributes are transmutable if new information for the consumer becomes available, and the collection of attributes (i.e., the number of different attributes stored for a given consumer) can also grow over time as new data is collected about the consumer. An aspect of the technology herein is that the graph is constructed from a potentially unlimited number of inputs for a given consumer, such as online, offline, behavioral, and demographic data. Those inputs are updated over time and allow the data for a given consumer to be refined, as well as allow the population of consumers on which data can be used to be expanded. The fact that there is no limit to the type and character of data that can be employed means that the methods herein are superior to those employed by panel companies, which rely on static datasets and fixed populations.

Some of the sources from which data is collected are as follows.

Type data is categorical data about a consumer that normally does not change, i.e., is immutable. Behavioral data is continuously updated based on a consumer's recent activity.

Each node includes a grouping of one or more devices (desktop, mobile, tablets, smart TV). For each device, data on the type of the user based on the device is collected from third party and first party sources.

Table 1 shows examples of data by category and source.

TABLE 1

| | 1st Party | 3rd Party |
|---|---|---|
| Non-transmutable | | Census (Govt.) Household income Education level (e.g., from Exelate) Gender (e.g., from Nielsen, DAR) |
| Transmutable | Behavior (online) TV viewing Viewability (e.g., how much of advert seen, kept on, visible online?) Online sites visited Location events | Offline behavior Retail Purchases Offsite visits (visited pharmacy, movie theater, car dealership, etc.) |

First party data comprises data on a user's behavior, for example: purchases, viewership, site visits, etc., as well as types such as income, gender, provided directly by a publisher to improve targeting and reporting on their own campaigns. (For example, the Coca Cola company might provide to a DSP, a list of users who "like" Coke products on social media, to improve their video advertising campaigns.) First party type data can be collected from advertisements served directly to the device, and from information collected from the device, such as one or more IP addresses. First party type data includes location from IP address, geolocation from mobile devices, and whether the device is located in a commercial or residential property.

Third party type data is obtained from external vendors. Through a one-on-one cookie synchronization or a device synchronization, an external vendor, for example a DMP such as Krux (www.krux.com/), Experian (which provides purchase behavior data), or Adobe, provides information about the cookie or device. Example data includes market segment occupied by the consumer, such as age range, gender, income level, education level, political affiliation, and preferences such as which brands the consumer likes or follows on social media. Additionally, external vendors can provide type data based on recent purchases attributed to the device. Third party data includes information such as gender and income because it is not collected directly from external vendors. Third party data can be collected without serving an advertisement. TV programs viewed and purchases are third party data.

First Party data is typically generated by a DSP; for example, it is data that the DSP can collect from serving an Ad or a Brand/Agency that provides the data. First party data includes data that depends on having served an Ad to have access to it.

Behavioral data can be collected from the devices through first party and third party sources. Behaviors are first party data typically, and are mutable.

First party behavioral data is collected from advertisements served directly to the device. This includes websites visited, and the TV program, or OTT, or video on demand (VOD) content viewed by the device.

Third party behavioral data is obtained from external vendors, typically DMP's such as Experian, Krux, Adobe, Nielsen and Comscore, and advertising exchanges or networks, such as Brightroll, SpotX, FreeWheel, Hulu. Example data includes the history of TV programming viewed on the device in the last month, the history of websites visited by a personal computer or laptop, or mobile device, and history of location based events from mobile devices (for example, whether the device was at a Starbucks). In some instances, the same types of data can be obtained from both first party and third party entities.

Edges between the nodes in the consumer graph signify that the consumers have a threshold similarity, or interact with each other. The edges can be calculated deterministically, for example, if the nodes are in physical proximity, or probabilistically based on similarity in attributes. Probabilistic methods utilized include, but are not limited to: K-means clustering, and connected components analysis (which is based on graph traversal methods involving constructing a path across the graph, from one vertex to another. Since the attributes are transmutable, the edges can also change, either in their weighting or by being created or abolished if the similarity score for a pair of nodes alters. Thus the graph is not static, and can change over time. In some embodiments, change is dynamic: similarity scores are continually recalculated as nodes attributes for nodes are updated.

Typically, attributes and data are added dynamically (as they are obtained). The graph may be re-constructed weekly to take account of the new attributes and data, thereby establishing new weightings for the edges, and identifying newly connected or reconnected devices. (Graph construction and reconstruction may be done in the cloud, i.e., by distributing the calculations over many processors on a computer network, or on processors warehoused at a datacenter under the control of the DSP.)

The similarity, S, between two nodes N_1, N_2, is calculated according to a similarity metric, which is the inverse of a distance function, $f(N\_1, N\_2): N\_1, N\_2 ->S$, that defines the similarity of two nodes based on their attributes.

In a consumer graph, similarity represents the likeness of two individuals in terms of their demographic attributes and their viewing preferences. Similarities can be calculated, attribute by attribute, and then the individual similarity attributes weighted and combined together to produce an overall similarity score for a pair of nodes.

When the attributes of two nodes are represented by binary vectors, there are a number of metrics that can be used to define a similarity between a pair of nodes based on that attribute. Any one of these metrics is suitable for use with the technology herein. In some embodiments, for efficiency of storage, a binary vector can be represented as a bit-string, or an array of bit-strings.

When working with a similarity metric that is the inverse of a distance function, $f(N\_i, N\_j)$, a zero value of the distance function signifies that the types and behaviors of the two nodes are identical. Conversely, a large value of the distance function signifies that the two nodes are dissimilar. An example of a distance function is Euclidean distance, $$f(N\_i, N\_j) = \|A\_i - A\_j\|^2$$

where A_i, and A_j are the sparse vectors representing the attributes of nodes N_i and N_j, and the distance is computed as a sum of the squares of the differences of in the values of corresponding components of each vector.

Comparisons of binary vectors or bit-strings can be accomplished according to one or more of several similarity metrics, of which the most popular is the Tanimoto coefficient. Other popular metrics include, but are not limited to: Cosine, Dice, Euclidean, Manhattan, city block, Euclidean, Hamming, and Tversky. Another distance metric that can be used is the LDA (latent Dirichlet allocation). Another way of defining a distance comparison is via a deep learning embedding, in which it is possible to learn the best form of the distance metric instead of fixing it as, e.g., the cosine distance. An example approach is via manifold learning.

The cosine dot product is a preferred metric that can be used to define a similarity between the two nodes in a consumer graph. The cosine similarity, that is the dot product of $A\_i$ and $A\_j$, is given by:

$$f(N\_i, N\_j) = A\_i \cdot A\_j$$

In this instance, the vectors are each normalized so that their magnitudes are 1.0. A value of 1.0 for the cosine similarity metric indicates two nodes that are identical. Conversely, the nearer to 0.0 is the value of the cosine metric, the more dissimilar are the two nodes. The cosine metric can be converted into a distance-like quantity by subtracting its value from 1.0:

$$f(N\_i, N\_j) = 1 - A\_i \cdot A\_j$$

An example of a more complex distance function is a parameterized Kernel, such as a radial basis function.

$$f(N\_i, N\_j) = \exp(\|A\_i - A\_j\|^2 / s^2),$$

where s is a parameter.

In the more general case in which the bit-string is a vector that contains numbers other than 1 and 0 (for example it contains percentages or non-normalized data), then one can calculate similarity based on distance metrics between vectors of numbers. Other metrics, such as the Mahalanobis distance, may then be applicable.

Typically, a similarity score, S, is a number between 0 and 100, though other normalization schemes could be used, such as a number between 0 and 1.0, a number between 0 and 10, or a number between 0 and 1,000. It is also possible that a scoring system could be un-normalized, and simply be expressed as a number proportional to the calculated similarity between two consumers.

In some embodiments, when calculating a similarity score, each contributing factor can be weighted by a coefficient that expresses the relative importance of the factor. For example, a person's gender can be given a higher weighting than whether they watched a particular TV show. The weightings can be initially set by application of heuristics, and can ultimately be derived from a statistical analysis of advertising campaign efficacy that is continually updated over time. Other methods of deriving a weighting coefficient used to determine the contribution of a particular attribute to the similarity score include: regression, or feature selection such as least absolute shrinkage and selection operator ("LASSO"). Alternatively, it is possible to fit to "ground truth data", e.g., login data. In some embodiments, as the system tries different combinations or features, which one leads to greater precision/recall can be deduced by using a "held out" test data set (where that feature is not used in construction of the graph).

Another way of deriving a similarity score for a feature is to analyze data from a successive comparison of advertising campaigns to consumer feedback using a method selected from: machine learning; neural networks and other multi-layer perceptrons; support vector machines; principal components analysis; Bayesian classifiers; Fisher Discriminants; Linear Discriminants; Maximum Likelihood Estimation; Least squares estimation; Logistic Regressions; Gaussian Mixture Models; Genetic Algorithms; Simulated Annealing; Decision Trees; Projective Likelihood; k-Nearest Neighbor; Function Discriminant Analysis; Predictive Learning via Rule Ensembles; Natural Language Processing; State Machines; Rule Systems; Probabilistic Models; Expectation-Maximization; and Hidden and maximum entropy Markov models. Each of these methods can assess the relevance of a given attribute of a consumer for purposes of suitability for measuring effectiveness of an advertising campaign, and provide a quantitative weighting of each.

Representation

To properly assess an entire population of consumers, a large number of nodes needs to be stored. Additionally, the collection of attributes that represent a node's types and behaviors can be sizeable. Storing the collection of the large number of attributes for the nodes is challenging, since the number of nodes can be as many as hundreds of millions. Storing the data efficiently is also important since the graph computations can be done most quickly and efficiently if the node data is stored in memory.

In a preferred embodiment, attributes are represented by sparse vectors. In order to accomplish such a representation, the union of all possible node attributes for a given type is stored in a dictionary. Then the type, or behavior, for each node is represented as a binary sparse vector, where 1 and 0 represent the presence and absence of an attribute, respectively. Since the number of possible attributes of a given type is very large, most of the entries will be 0 for a given consumer. Thus it is only necessary to store the addresses of those attributes that are non zero, and each sparse vector can be stored efficiently, typically in less than $\frac{1}{100}^{th}$ of the space that would be occupied by the full vector.

As an example, let the attributes encode the TV programs that a given consumer has viewed in the last month. The system enumerates all possible TV shows in the dictionary, which can be up to 100,000 different shows. For each node, whether the consumer watched the show in the last month is indicated with a 1, and a 0 otherwise.

If the attributes indicate different income levels, multiple income levels are enumerated, and a 1 represents that the consumer belongs to a particular income level (and all other entries are 0).

Thus for a consumer, i, having an annual income in the range $30,000-$60,000, and who has viewed "Top Gear" in the last month, the following is established:

TV_Dictionary={"Walking Dead", "Game of Thrones", . . . , "Top Gear"}

TV_$i$=[0,0, . . . ,1]

TV_i can be stored as simply [4]; only the 4th element of the vector is non-zero. Similarly, for income:

Income_Dictionary={<$30,000, $30,000-$60,000, $60,000-$100,000, >$100,000}

Income_$i$=[0,1,0,0]

Income_i can be stored as simply [2], as only the second element of the vector is non-zero.

All the attributes of a node, i, can thus be efficiently represented with sparse vectors. This requires 2 to 3 orders of magnitude less memory than a dense representation.

Graph Construction

Figure 4A:
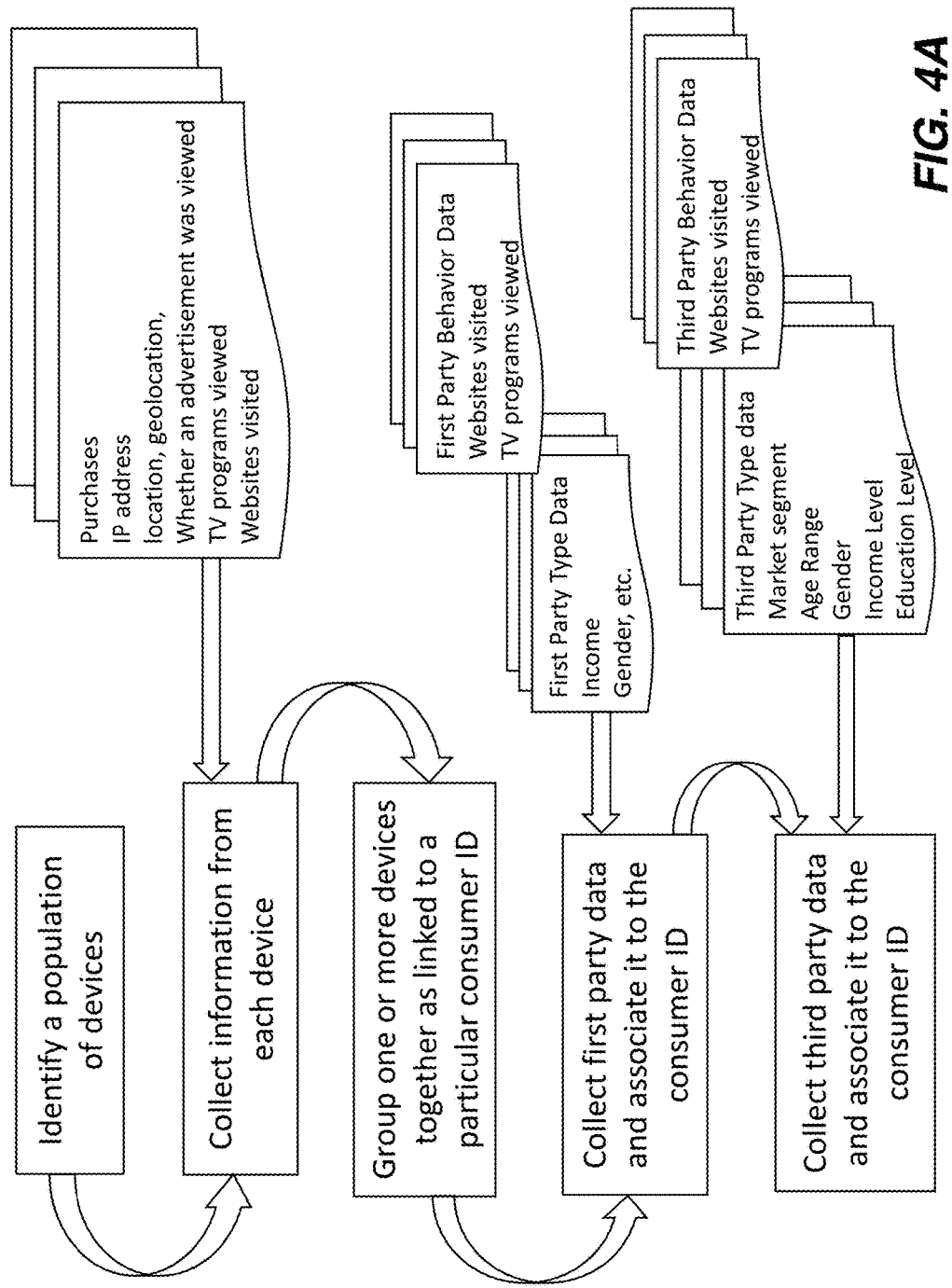
FIGS. 4A and 4B show steps in creation of a consumer graph.
Figure 4B:
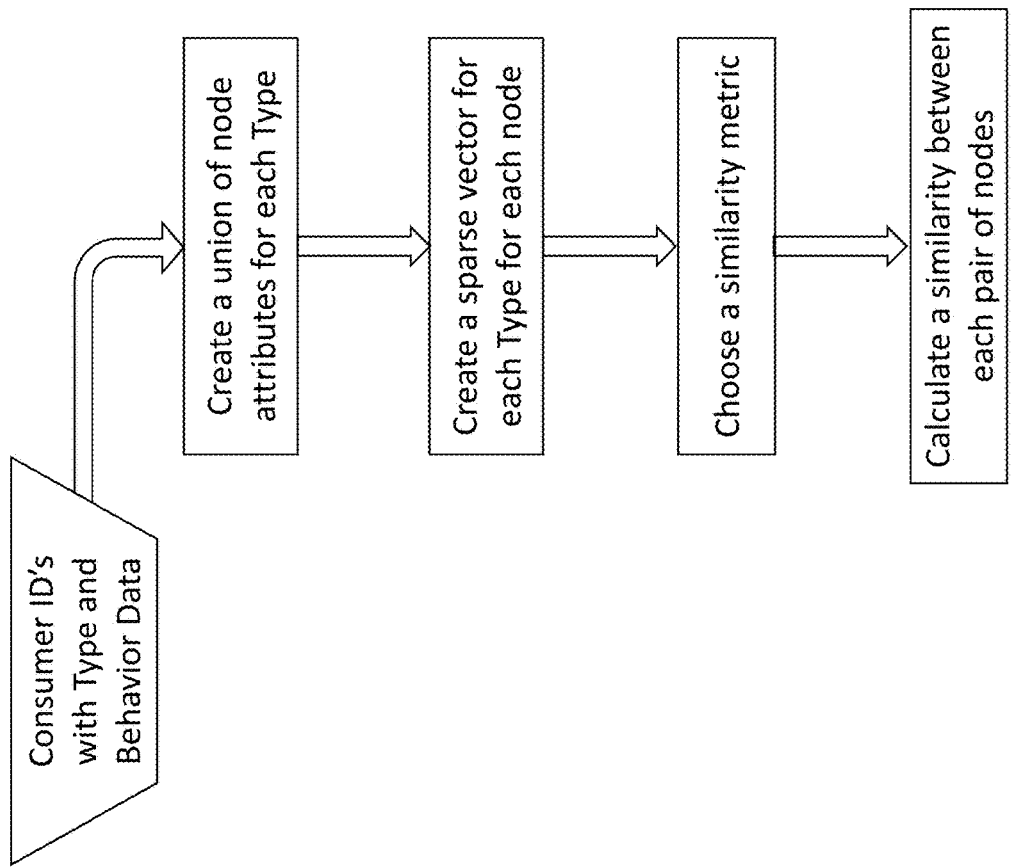

FIGS. 4A and 4B illustrate a flow-chart for steps in construction of a consumer graph.

Initially, the graph is a collection of devices, which are mapped to consumers. Multiple data sources are used to group multiple devices (tablet, mobile, TV, etc.) to a single consumer. This typically utilizes agglomerative techniques. In order to attribute a single device (e.g., a Smart TV) to multiple consumers, a refinement technique is used.

With agglomerative methods, multiple devices can be grouped to a single consumer (or graph node). Some data sources used for this include, but are not limited to:

IP addresses: multiple devices belonging to same IP address indicates a single consumer or a household.

Geolocation: multiple devices that are nearby, using latitude and longitude, can be attributed to a single consumer.

Publisher logins: if the same consumer is logged in from multiple devices, those devices can be associated with that consumer.

During this process, the consumer's identity is masked, to obviate privacy concerns. The result is a single consumer ID that links particular devices together.

Let $P(d\_i, d\_j)$ be the probability that the two devices, $d\_i$ and $d\_j$, belong to the same node (consumer, or household). From multiple datasets obtained from different categories of device, it is possible to construct the probability:

$$P(d\_i,d\_j)=w\_IP \times P(d\_i,d\_j|IP) \times w\_Geo \times P(d\_i,d\_j| Geo) \times w\_Login \times P(d\_i,d\_j|Login)/Z$$

where "×" means "multiply", where $w\_$ are weighting factors, $P(d\_i, d\_j|Y)$ is a conditional probability (the probability of observing device i and device j belong to same user, if Y has the same value for both, and Z is a normalizing factor. Thus, Y may be an IP address. (The value of the conditional probability may be 0.80). Each data source gets a different weighing factor: for example, login data can be weighted higher than IP addresses. The weights can be fixed, or learned from an independent validation dataset.

Once multiple devices are grouped to a single node, the Types and Behaviors from the respective devices are aggregated to the singular node's attributes. For example, attributes (and the corresponding sparse vectors) from mobile (such as location events), and desktop (recent purchases) are aggregated. This provides more comprehensive information for a consumer, permitting more accurate and meaningful inferences for a node to be made.

Associating a device with a given consumer is possible due to the data that is associated with those devices and known to various media conduits. For examples, a Smart-TV stores location information as well as subscription information about the content broadcast by it. This information is shared with, and can be obtained from, other entities such as a cable company. Similarly, a mobile device such as a tablet or smartphone may be associated with the same (in-home) wifi network as the Smart-TV. Information about the location is therefore shared with, e.g., the cellphone carrier, as well as broadcasters of subscription content to the mobile device. A key aspect of the graph methodology herein is that it permits consumer information to be linked across different device and media platforms that have typically been segregated from one another: in particular, the graph herein is able to link consumer data from online and offline purchasing and viewing sources with TV viewing data.

With refinement methods, a single device (for example, a smart TV) can be associated with multiple consumers (or graph nodes) who, for example, own mobile devices that are connected to the same wifi network as the smart-TV.

Given a node, n, to which are assigned multiple devices, the various attributes are clustered into smaller groups of devices, for example, a TV ID, connected to multiple devices from a common IP address. The TV viewership data is aggregated along with the attributes from all the devices. A clustering algorithm, such as k-means clustering, can be applied to group the devices into smaller clusters. The number of clusters, k, can be set generally by the number of devices (by default k=# number of devices/4). Sometimes it is possible to only collect aggregate data at a household level. For example, there may be as many as 20 devices in one household. But by using behavioral data, it can be ascertained that the 20 devices have 4 major clusters, say with 5 devices each, where the clusters correspond to different individuals within the same household. Thus, although there are two categories of device (shared and personal), it is still important to attribute behavioral data to users.

Once a shared device is attributed to multiple nodes, the data collected from the device can be attributed to the nodes. For example, TV viewing data from a Smart TV can be collected from the OEM. Through this attribution, the TV viewing data can be added to the collection of a node's attributes. Ultimately, a Smart-TV can be attributed to different persons in the same household.

Lookalike Modeling by Learning Distance Functions

Given a graph, G(N, E), and a functional form that defines a similarity metric, and a set of seed nodes, it is possible to generate a set of "lookalike" nodes that are similar to the seed nodes, where similarity is defined by a function that is fixed, or learned. This is useful when identifying new consumers who may be interested in the same or similar content as a group of consumers already known to an advertiser. Similar principles can be utilized when projecting likely viewing behavior of consumers from historical data on a population of consumers.

Seed nodes can be a set of nodes, e.g., household(s) or individual(s), from which to generate a set of lookalike nodes using a fixed, or learned, similarity metric. For example, seed nodes can be defined as an audience segment (such as list of users that saw a specific show for certain). This is useful for determining, for each member of the audience segment, a list of other audience members who might have similar viewing habits even if they did not watch exactly the same show as the seeds.

Given the set of seed nodes in a graph (and their attributes), the output of lookalike modeling is a set of nodes (that includes the seed nodes) that are similar to the seed nodes based on the fixed or learned similarity metric.

Several different vectors can be used in determining look-alike models: One is the vector of TV programs in total. This vector can be as long as 40 k elements. Another vector is the list of consumers who saw a particular program (e.g., The Simpsons). The vector of viewers for a given TV program can be as long as 10M elements because it contains one element per consumer. Another vector would be a vector of web-sites visited (say 100 k elements long). Still another vector would be based on online videos viewed (which can also be 100 k elements long).

In general, TV program comparison data accesses a 10M user base. Online data can identify a potentially much larger audience, such as 150M consumers. It should be understood that TV data can be accumulated across a variety of TV consumption devices that include, but are not limited to linear, time-shifted, traditional and programmatic.

The similarity between 2 distinct nodes can be calculated from their attributes, represented by sparse vectors. Given a distance function $f(N\_i, N\_j)$, and a set of seed nodes, $N\_S$, the pairwise distances between each element of the seed nodes, n in $N\_S$, and all other nodes other than the seed node, n', are calculated. That is, all quantities $f(n, n')$ are calculated.

After calculating all pairwise similarities, only the nodes such that $f(n, n') < T$ are selected. T is a threshold maximum distance below which the nodes are deemed to be similar. Alternatively, values of f(n, n') (where n is not n') are ranked in decreasing order, and the top t node pairs are selected. In either case, T and t are parameters that are preset (provided to the method), or learned from ground truth or validation data. The set of all nodes n' that satisfy the criteria above, form the set of "lookalike nodes".

Graph Inference

Given a graph G(N, E), it is also possible to infer likely attributes of a node, n, based on the attributes of its neighbors in the graph. This can be useful when incomplete information exists for a given consumer but where enough exists from which inferences can be drawn. For example, TV viewership attributes may be missing for a node n (in general, there is either positive information if a user did watch a show, or it is unknown whether they watched it), whereas those attributes are available for neighbor nodes n', n" in the graph. Nodes n, n', and n" contain all other attributes, such as income level and websites visited.

In another example, it can be useful to calculate the probability that the consumer associated with node n would watch the show "Walking Dead", given that n', n" both also watch "Walking Dead". If the similarity, given by the weight of the edges between n and n', n", are w', w"=0.8 and 0.9 respectively, and the likelihood of n watching the show based on his/her own attributes is 0.9, then the probability is given by:

$$P(n \text{ watches "Walking Dead"})$$
$$= [0.8 \times 0.9 + 0.9 \times 0.9]/[0.8 \times 0.9 + 0.9 \times 0.9 + (1 - 0.8 \times 0.9) + (1 - 0.9 \times 0.9)]$$
$$= 0.765$$

Similar principles can be utilized when projecting likely viewing behavior of consumers from historical data on a population of consumers.

Accuracy

The graph is continually refined as new data is received. In one embodiment, a technique such as machine learning is used to improve the quality of graph over time. This may be done at periodic intervals, for example at a weekly build stage. It is consistent with the methods herein that the graph utilized is updated frequently as new consumer data becomes available.

To determine the accuracy of the graph, the precision and recall can be compared against a validation dataset. The validation dataset is typically a (sub)graph where the device and node relationships are known with certainty. For example, the login information from an online network such as eHarmony, indicates when the same user has logged into the site from different desktops (office, laptop), and mobile devices (smartphone and tablet). All the devices that are frequently used to login to the site are thus tied to the same consumer and thereby that individual's graph node. This information can be used to validate whether the constructed graph ties those devices to the same node.

If D is the set of devices in the validation set, let Z(D) denote the graph, consisting of a set of nodes, constructed from the set of devices, D. For different datasets, and different graph construction methods, it is possible to obtain different results for Z(D).

For the set Z(D), true positive (TP), false positive (FP) and false negative (FN) rates can all be calculated. True positives are all nodes in Z(D) that are also nodes in the validation set. False positives are all nodes in N(D) that do not belong to the set of nodes in the validation set. False negatives are all nodes that belong to the validation set, but do not belong to Z(D).

Precision, defined as TP/(TP+FP), is the fraction of retrieved devices that are correctly grouped as consumer nodes.

Recall, defined as TP/(TP+FN), is the fraction of the consumer nodes that are correctly grouped.

Depending on the application at hand, there are different tradeoffs between precision and recall. In the case of constructing a consumer graph, it is preferable to obtain both high precision and high recall rates that can be used to compare different consumer graphs.

The validation dataset must not have been used in the construction of the graph itself because, by doing so, bias is introduced into the precision and recall values.

Learning the Similarity Metric:

Another feature of the graph that can be adjusted as more data is introduced is the underlying similarity metric. Typically, the metric is fixed for long periods of time, say 5-10 iterations of the graph, and the metric is not reassessed at the same frequency as the accuracy.

In the case where the distance function is not fixed, it is possible to learn the parameters of a particular distance function, or to choose the best distance function from a family of such functions. In order to learn the distance function or its parameters, the values of precision and recall are compared against a validation set.

Suppose a goal is to predict the lookalike audience segment that are high income earners, based on the attributes of a seed set of known high income earners. The similarity of the seed nodes to all other nodes in the graph is calculated for different distance functions, or parameters of a particular distance function. The distance function uses the attributes of the nodes, such as online and TV viewership, to calculate the similarities.

For example, if the distance function is the radial basis function with parameter, s:

$$f(N\_i, N\_j) = \exp(\|A\_i - A\_j\|^2 / s^2),$$

then the pairwise distances from the seed nodes to all other nodes, are calculated for different values of s, using the same threshold distance value, T, to generate the set of lookalike nodes. For different values of s (the parameter that needs to be learned), the calculations produce different sets of lookalike nodes, denoted by N_S(s).

For the set N_S(s), it is possible to calculate true positive (TP), false positive (FP) and false negative (FN) rates. True positives are all nodes in N_S(s) that also belong to the target set in the validation set. In this example, all the nodes that are also high income earners (in ground truth set). False positives are all nodes in N_S(s) that do not belong to the target set (not high income earners). False positives are all nodes in N_S(s) that do not belong to the target set (not high income earners). False negatives are all nodes that belong to the validation set (are high income earners), but do not belong to N_S(s).

Based on the application, it is possible to require different tradeoffs between precision and recall. In the case of targeting an audience with an advertisement, a high recall rate is desired, since the cost of exposure (an advertisement) is low, whereas the cost of missing a member of a targeted audience is high.

In the example herein, the aim is to choose the value of s for which both the precision and recall rates are high from amongst possible values of s. For other types of distance function, there may be other parameters for which to try to maximize the precision and recall rates.

The accuracy of a lookalike model can only be defined for a target audience segment. For example, it is possible to predict whether a lookalike segment also comprises high income earners, from a seed set of high income earners using TV viewing and online behavior datasets. Predictions can be validated using a true set of income levels for the predicted set of nodes. This gives the accuracy of the predictions. However, the accuracy of predictions for one segment are not meaningful for a new target segment, such as whether those same users are also luxury car drivers.

Calculating Deduplicated Reach

The consumer graph connects a node (consumer) to all the devices that he or she uses. Thus the graph enables deduplicating the total exposure to an advertisement, to individuals. For example, if user abc 123 has already seen a particular advertisement on each of his TV, desktop and mobile device, the total deduplicated exposures will count as 1. This enables the calculation of the following metrics for direct measurement.

The deduplicated exposed audience is the number of users belonging to the target audience segment in the consumer graph who were exposed to the advertisement after deduplication. Then, the direct deduplicated reach is:

Deduplicated Reach=Deduplicated Exposed Audience/Total Audience

For sampled measurement, this enables the calculation of the deduplicated exposed sampled audience as the number of sampled users who belong to the target audience segment who were exposed to the advertisement after deduplication. Then, the sampled reach is:

Deduplicated Sampled Reach=Deduplicated Exposed Sampled Audience/Total Sampled Audience In the case of modeled measurement data, the ID of the user in the consumer graph from whom the data was collected is not known. Hence, the reach data cannot be deduplicated on a one-to-one level.

Calculation of deduplicated reach can be useful in managing targeting, if an advertiser wants to impose a frequency cap on consumers (for example, if the advertiser doesn't want to show the same advert to the same user more than twice). Deduplicated reach also provides a convenient metric by which to optimize the efficacy of an advertising campaign: for example, by calculating the deduplicated reach over time, as an advertising campaign is adjusted, improvements can continue to be made by altering parameters of the campaign such as, for example, consumer demographic, or time and channel of broadcast of TV content.

Calculating Incremental Reach

On day t, let the deduplicated reach (direct or sampled) be x. The incremental reach is the additional deduplicated reach after running the campaign. In a cross-screen environment, this is a useful parameter to calculate if an advertiser wants be able to assess whether they can extend a 30% reach via TV to say, a 35% reach by extending to mobile platforms. One caveat is that in direct measurement of, e.g., TV data, the portion of the sample obtained for smart-TV's is only a subset of the overall data, due to the relatively small number of smart-TV's currently in the population at large.

In the case of modeled measurement data such as is obtained from a panel where the nature of the sample has to be inferred, the ID of the user in the consumer graph from whom the data was collected is not known. Hence, it is not possible to tell if the same user has viewed the advertisement in the past. Therefore the incremental deduplicated reach cannot be calculated for modeled data because devices cannot be associated with particular users. Since the incremental reach from the sampled measurement, without deduplication, can be calculated, as described above, the methods herein are superior to panel-based methods.

Programmatic-TV Bidding

The technology herein provides advertisers with a way to bid on PTV slots, using at least in part, consumer/device graph data that ties particular known segments of the consumer population to TV viewers. PTV bidding is different from digital real-time bidding (RTB), which is utilized for online and other digital applications (for example, as handled by other DSP's), in at least two ways.

A SSP (such as WideOrbit, Videa, Clypd) aggregates TV inventory from a plurality of local TV stations into a common marketplace. DSPs make bids for individual or multiple TV spots. Unlike RTB (real-time bidding), which applies to digital inventory and is such that the response time to acknowledge a bid is typically fractions of a second (often milliseconds), the feedback time on a TV bid can be anywhere from a single day to several weeks. In RTB, e.g., utilizing protocol RTB 2.0-2.4, see Internet Advertisers Bureau at www.iab.com/guidelines/real-time-bidding-rtb-project/, a bid request is broadcast by a supplier for an immediately available advertisement impression. Bidders respond with a maximum bid price, based on the parameters of the bid request. There is typically a short time window (less than 50 ms) to receive bids. Once all the bids are accepted, the exchange conducts a second price auction. The winner gets notified, and all others receive a notification of loss. The uncertainty for the advertiser is over the probability of obtaining a winning bid at a given price.

Analog TV bidding is slower than programmatic TV bidding because it is not real-time and not readily susceptible to algorithmic implementations. In Programmatic TV bidding, bids are accepted for upcoming spots, up to 14 days in advance, but the bidding may include content that is just 1-2 days away from being broadcast.

Additionally, for programmatic TV bidding, the feedback response from the content provider can be one of accept, hold, or decline instead of just a win/loss response. With a "loss" or "decline" signal, additional feedback can be provided so that the bidder can revise and resubmit the bid offer. A machine learning system constructs a probability distribution of win/hold, and loss rates for different bid prices, and parameters that define a spot. The probability distribution to be learned is therefore more complex (and has more dimensions) than in the RTB approach.

This introduces additional complexity that current digital bidding solutions are not equipped to handle. A bidding architecture and method for PTV bidding consistent with the methods and technology herein is as follows.

Figure 5:
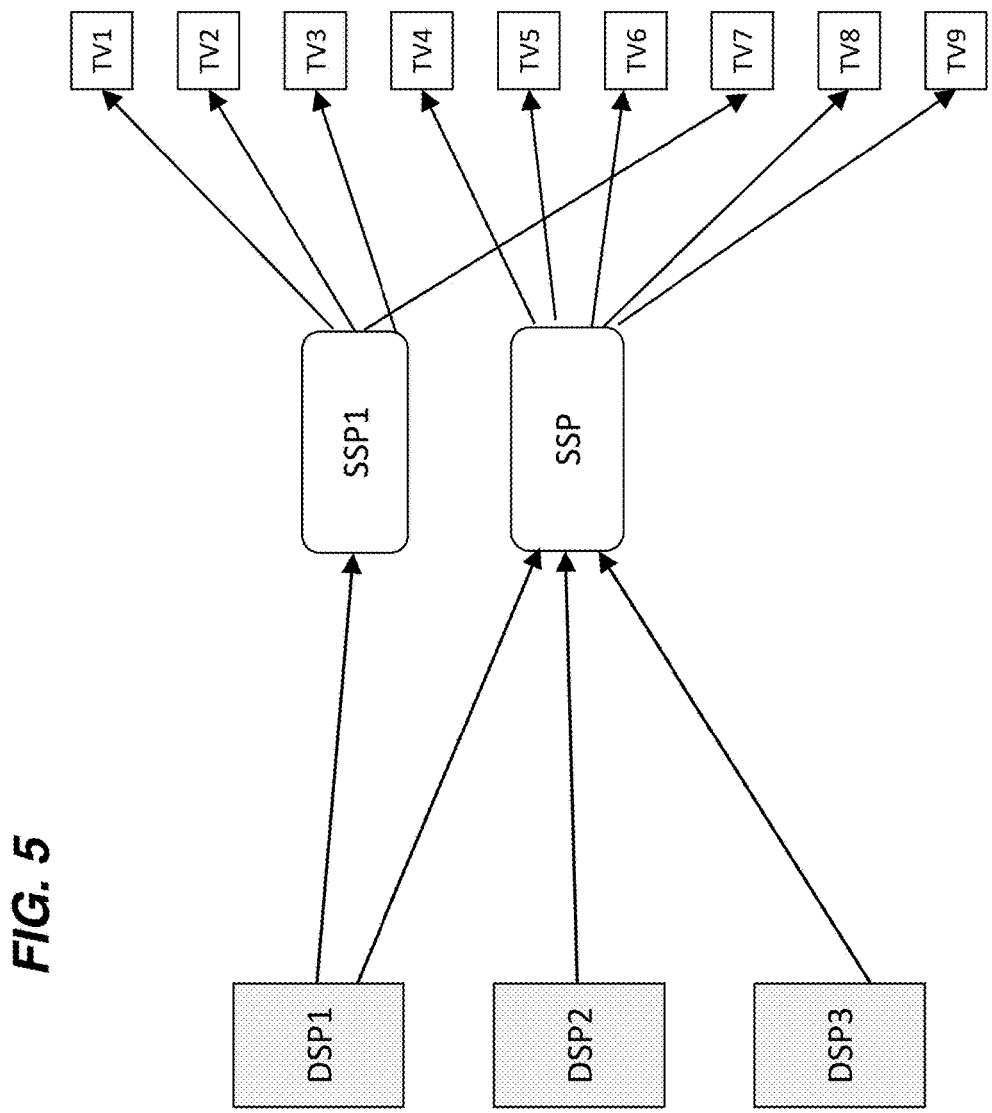
FIG. 5 shows relationships between various entities in the advertising purchase realm.

In the PTV marketplace, illustrated in FIG. 5, one or more SSPs (SSP1, SSP2, etc.) such as WideOrbit, Videa or Clypd has a programmatic interface to all the TV supply from TV stations TV1, TV2 . . . TV9, and aggregates that supply. Demand side platforms, DSP1-DSP3, etc., such as entities that can perform the methods herein, have previously only used real-time bidder methods (RTB) to make bids on online inventory, and have accepted that the bidding process on TV inventory takes longer.

According to the methods herein, the decision to bid on an item of inventory, and the corresponding bid price, are based on expected performance of one or more certain key performance indicators (KPIs). In the case of PTV inventory buying, the two main categories of KPI are "audience reach" and "direct response." Other KPI's can be related to the cost effectiveness of a campaign: for example, the cost per consumer reached (knowing the total cost of advertisement placement) can be calculated and optimized in order to continually refine the campaign. KPI's can inform relevant optimization metrics.

In the category, audience reach, KPIs relate to the exposure of the advertisement to targeted audience populations, as measured by the reach, or deduplicated reach.

By contrast, direct response KPIs relate to immediate actions taken by consumers exposed to an advertisement, such as: website visits (expressed as an average number of visits to the advertiser's website by users after being exposed to the advert); online purchases (purchases made in online stores e.g., Amazon.com, by users exposed to the advertisement); offline purchases (purchases made in physical stores, like a retail store or grocery store, by users exposed to the advertisement); and location events (the average number of times the users exposed to the advertisement visited a particular location after watching the advertisement).

Bidding on advertising slots based on programmatic TV data depends on targets set by the advertiser such as a certain minimum GRP, and one or more optimization metrics; the outcome is a choice of slots, and a bid price.

Bids are made for a future TV spot (i.e., a slot in a program schedule), and bids can typically be placed as much as two weeks in advance of that spot being aired. For special events such as sporting events whose date is known well in advance (e.g., the annual SuperBowl, or the World Series), bids may be placed even further ahead of time. Multiple bids can be placed for the same spot on separate days as a contingency if the bid on a preferred day was unsuccessful. There are several parameters that define a spot, including: the program title (e.g., The Simpsons), daypart (a portion of a given day in which the program is broadcast, e.g., Primetime, late night, which might permit differentiation between screening of new content vs. re-runs), and the geographical area in which the program is broadcast (e.g., New York designated market area (DMA), or by zip-code).

There are two forms of uncertainty in the bidding and feedback process: whether a bid will be successful, and, if successful, what will be the performance of the advertisement. This leads to two types of bidding approaches. In "exploration", the bidder doesn't have enough data to conclude how valuable a slot may be, and can't say with 100% certainty that slot is worth a given price, $x. This may be because the slot is associated with a whole new type of program, or the first season of a new show. In this case, the advertiser must simply submit a bid and see how it turns out. In "exploitation", the bidder is using a significant body of data that has already been generated. A unique aspect of this type of bidding is that there are tradeoffs between the two types of approach.

There are three possible outcomes of a bid: Win (success; the bid offer has been accepted by seller); loss (failure; the bid offer was declined by seller); and "hold" (the seller has accepted the bid as part of a block or "rotation" of spots/inventory). If a bid is successful, the ad is broadcast to all of the TVs in the targeted demographic.

A "hold" is an intermediate outcome for an advertiser. For example, if the advertiser bid on a particular 2 of 8 offered spots between 9 and 12 pm, and the seller commits to playing the ads in 2 of the 8 spots but without specifying which of the particular spots, that is a "hold". Another type of hold is where an advertiser specified a number of slots; the didn't win top choice but were provided an alternate set of slots or a subset of the slots bid on, not including the most preferred slot. In such instances, the advertiser might make a second bid to get the remaining slots, or make another bid on other similar slots.

Additional feedback can accompany a loss outcome, such as a possibility of revising and resubmitting the bid, but in general, more informative information to the advertiser is gleaned from a "hold" outcome.

This is a unique aspect of bidding on programmatic TV content. If a bid price wins, it maybe because the price was too high and the advertiser will not know how much lower it could have bid and still have been successful. By contrast, a hold means in practice that the spot is locked and pooled together with other spots of a similar character. For example, there may be 10 slots available, and an advertiser bids on two of them. The two spots for which a "hold" is returned will be cleared when the whole block clears. That gives an advertiser a better idea of what price they can bid and be confident that they will not lose outright. For this reason, a hold outcome has more information (and thus a greater reduction in uncertainty) for an advertiser than a win outcome, since the advertiser can infer the clearing price for an entire block of spots when the response is a hold. Thus in programmatic TV bidding, a good heuristic is to aim for a Hold outcome, rather than a Win outcome, a factor that differentiates it from the digital RTB case. Conversely, if a bid is initially 'successful' (a 'win'), the outcome guaranteed. In other words, the highest bidder cannot be outbid in subsequent rounds of bidding.

In the bidding process, therefore, there is uncertainty over whether a bid price for a specific spot (as defined by program title, daypart, DMA, etc.) will lead to a win, loss, or hold. It is possible to construct a probability distribution, $\Pi$, of the outcome of a bid (win, loss or hold) for parameters such as descriptions of the inventory (such as daypart, TV program) and/or audience demographics (DMA), etc. In the formulae, the parameters are collectively given by Theta, $\theta$, for a given bid price (P):

$$\Pi(\text{Outcome}=\text{Win}/\text{Loss}/\text{Hold}|\theta,P)$$

As a DSP obtains more sample data on outcomes at different bid prices for specific parameters, the less the uncertainty over the outcome. The probability distribution, H, can be refined with Bayesian updating after observing each new data point.

The other form of uncertainty is how well the advert will perform in the given TV spot, as measured by audience reach or direct response KPI's. After the advertisement is served on a spot, by measuring the reach (such as GRPs) or direct response (like website visits), some aspect of performance can be quantified. Since the performance of a spot is not repeatable, (it can vary with time), the uncertainty of the spot's performance can be denoted by, for example: $\Pi(\text{KPI}=50 \text{ GRPs}|\theta)$. Such a formula represents the probability of hitting a given KPI (such as 50) for a particular type of slot described by parameters $\theta$.

Bayesian updating can be used to depict the uncertainty, which declines as more data points are observed.

When bidding on a TV spot, an advertiser wants to set a bid price so that it can achieve a win or hold outcome, as well as to bid on specific spots at a specific price to achieve an expected performance (an audience reach or direct response KPI). It is possible to identify a spot with low uncertainty on expected performance at a price that has a high probability of win/hold. This is the case for spots where a lot of data is available, and is the "exploit" scenario, as described hereinabove. Alternatively, it is possible to pick a spot and a price where there is very little or no sampled data; by finding a spot that has a high performance and leads to a win or a hold at low bid prices, it is possible to greatly reduce the uncertainty of the unknown spot. This is the "explore" scenario, as described hereinabove.

Figure 6:
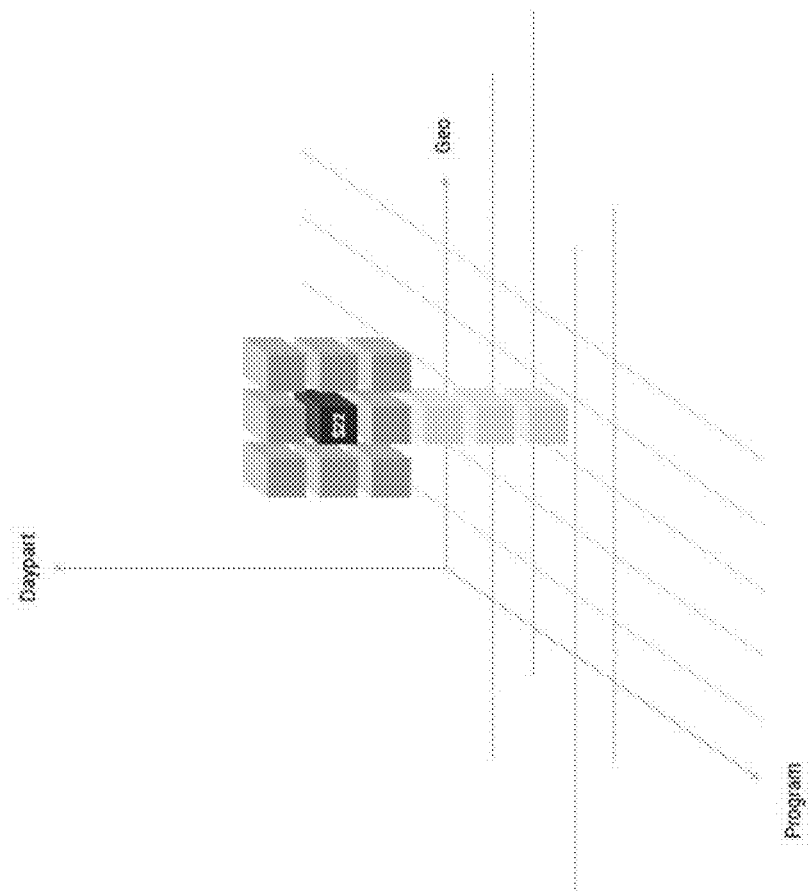
FIG. 6 shows a multi-dimensional data set.

The ability to base bids on a growing body of information about previously successful (and unsuccessful) bids allows the overall bidding process to be more efficient for a given advertiser. FIG. 6 illustrates this. From a lot of samples, suppose it is known that an advertiser can obtain a certain level of GRP's at a particular bid price ($22 in this example) and at particular values of a set of other variables. That bid price represents a location in multi-factor space, represented by the dark box in FIG. 6. In this example, for convenience of representation, there are three variables (shown on orthogonal axes as location, daypart, and program name), though in practice there may be more than 3. The gray boxes represent information (feedback values, or outcome probabilities) about less successful bids: if the advertiser can deviate from the optimal bid, the outcome will be close and the advertisement may give rise to a similar type of performance. This knowledge leads to reduced uncertainty in the outcome of a bid, and is based on an iterative learning process. The darker the box in the grid, the more certain the outcome. The values for the other boxes allow an advertiser to make inferences on the values of similar blocks of inventory, based on having similar parameters, such as same daypart or same geographic location.

The objective of bidding is to maximize the performance metric (audience reach, or direct response KPIs) at a given price, or to achieve a level of performance for the lowest cost. Since the performance is uncertain, another spot for which data is not available could have performed better at a lower cost. Thus in the long term, for the bidder, there is value in data collection by exploring spots with high uncertainty. This principle is captured by an exploration bonus parameter, U. The general form of the objective function is given by equation (1):

$$\text{Value[spot]}=\text{ExpectedValue[spot]}+U^*\text{Reduction in Uncertainty[spot]} \quad (1)$$

The expected value of the spot is obtained from the expected performance by integrating over the uncertainty values. Thus, an exemplary definition of the expected value is given by equation (2):

$$\text{ExpectedValue[spot]}=\Sigma_\theta P(KPI=x|\theta)\sigma(KPI|\theta) \quad (2)$$

Here $\sigma(KPI|\theta)$ is the uncertainty over the value that KPI will equal x for a given $\theta$. The sum is taken over all values of $\theta$.

The reduction in uncertainty of the spot can be given by criteria such as the expected reduction in entropy, or value of information, or information gain, according to formulae standard in the art.

An exemplary definition of change in uncertainty is given by equation (3):

$$\Delta\text{Uncertainty}[\theta]=\sigma(KPI|\theta)-\Sigma_x\sigma(KPI=x|\theta) \quad (3)$$

where the sum is taken over all discretized values of the KPI.

The foregoing formula, when applied in conjunction with good data, lead to advantages in the bidding process.

Programmatic TV Bidding Method

An exemplary method of bidding on a Programmatic TV slot, can be expressed as follows. First, an advertiser sets a target budget, B. In the following, let S denote the set of all available spots.

i. Enumerate all sets s in S.
 ii. Compute the value of set s using Equation (1).
 iii. Assign a bid price P(s) to each s, using a prior distribution
  P(Outcome=Win/Loss/Hold|s, P(s)).

The prior distribution can be estimated from rate card data, for example ones provided by a company such as SQAD (Tarrytown, N.Y.; internet at sqad.com). Certain data providers specialize in information for TV buying: based on relationships with sources of TV inventory spots, they supply price ranges for advertising slots.

iv. Enumerate all (non-repeating) combinations of s, and denote each combination by $\theta$.
 v. Calculate a Score by summing over all values of s in $\theta$.
 vi. Score[$\theta$]=$\Sigma_s$P(s) P(Outcome=Win/Hold|s, P(s)) P(KPI=x|s)
 vii. Choose the $\theta$ with the highest score such that the expected target budget $\Sigma_s$ P(s) P(Outcome=Win/Hold|s, P(s))<=B.

The spots to bid on are the ones in the combination $\theta$, that maximize the value of the Score, and whose expected target budget is less than B.

The expected target budget is calculated by taking into account the probability that the bid price P(s) will have an outcome of Win or Hold. Essentially, if the average probability of a Win or Hold outcome is expected to be 0.10, then by bidding on spots with a total budget of 10B, the advertiser expects to spend a budget of B.

Modeling of User Device Habits

Solving the issue of disparate data tracking requirements involves processing data inputs that may have sequencing tags that reflect the nature of each category of device or medium. On one embodiment, the technology herein addresses this issue by allocating data based on the nature of each device. For example, a first batch of consumer data is limited to data mapped from the specific devices that a specific consumer uses, the sources being a plurality of third party APIs. This device data updates such aspects as when, where, how, how long, and the level of engagement by the consumer, on each particular device. The data is then integrated and processed separately from other consumer data. All device usage data is integrated to create a more precise understanding of the access points and behavior of the consumer over time.

In another example, a batch of consumer data is based on consumption data. Within the data stored for each device, exists the potential to include a further plurality of third party data concerning actual media consumed. This data can be obtained from content providers, OEMs, publishers, other data aggregators, and measurement providers (such as Nielsen). This data provides information as to what content the consumer has watched. By understanding what a consumer has watched, it is possible to understand the consumer's taste and preferences, understand what TV shows they are watching, as well as when, where and on what device they are watching them. There are various deterministic methods (for example, understanding which member of the family has logged into their Netflix account) to determine which individual in a household is viewing which content.

With such a structure, the system is capable of integrating and processing data within different categories as well as across different categories. One example of this is comparing a complete set of user data for a given consumer to complete sets of data on other members of the market segment. Each complete user dataset is cross-compared to every other user dataset. The system then matches like behaviors, and is able to determine granular differences which may affect advertising performance. Such determinations then also fine tune the predictive algorithm on a consumer-by-consumer basis.

Setting Up an Advertising Campaign

An advertiser selects various campaign parameters and campaign goals. The advertiser can select particular parameters such as a demographic, and then values for a percentage of the overall population that meets the criteria of the campaign. For example, the advertiser can target women located in California between the ages of 20 and 30 years old, and specify a reach of 20% of that segment of the population. Another criterion could be the frequency by which the advertisement reaches a particular demographic, such as "two impressions for each age group". Criteria can be narrowed to identify users who are known to be in the market for a particular product, e.g., targeting women who have recently searched for a Nike® shoe.

Taken together, the advertiser-specified criteria can be ranked and weighted by importance. For example, women from San Francisco could be weighted more highly than women located in Sacramento; in which case, the system can allocate and budget impressions to those particular subsets of the overall demographic with higher weights. Additionally, special classifications can be placed on viewers based on their product purchase patterns and media consumption. Assumptions can be built into the campaign parameters based on purchase history, such that individuals who have purchased luxury handbags are more inclined to respond favorably to luxury handbag advertisements.

Next, the system makes it possible to run the various campaign parameters and goals against consumer data from first party databases, and received via third party API's.

The underlying consumer data inputs are integrated from a plurality of sources, which include internally developed datasets produced via a machine learning process, as well as third party data sources. For example, third party API's representing consumer and viewer data can be combined with data that exists as a result of internally processed data streaming from a series of processes that, for example, track viewer behavior and can predict viewer outcomes. Purchasing suggestions are provided, and comparisons can be derived based on the application of relevant, real-time metrics. The system can further assist in the execution of deal bidding and buying.

In a preferred embodiment, bidding and buying of programmatic TV advertising inventory is achieved at a much faster rate, and with a more reliable outcome, compared to existing methods due to the use of integrated data from a number of different sources, and the bidding methods described herein. This improvement also provides significantly better accuracy in predicting data models around media consumption and consumer behavior. For example, the system is able to incorporate a range of data related to other buyers on the exchange, so that purchases are optimized based on considerations such as the distribution of inventory.

In a preferred embodiment, the system incorporates APIs from third parties who track relevant metrics such as consumer behavior and consumer demographics (for example, age, race, location, and gender). Relevant metrics are analyzed against the buyer's campaign requirements, such as budget, desired audience, and number of impressions.

The system intakes programmatic TV inventory data via APIs from TV networks, distributors such as cable companies, and content providers. In some embodiments of the system and methods herein, data concerning inventory is aggregated across different mediums, so that inventory available for digital, mobile, TV (linear and programmatic), and OTT may be combined, thereby allowing advertisers to allocate their budget across a variety of mediums, device categories and content channels.

Once the advertiser has assigned campaign parameters, and the system has identified the possible inventories, the system permits the advertiser to choose a strategy for optimizing the allocation of impressions. There are various advertising strategies available to the advertiser.

Exemplary factors for advertising strategies are as follows:

Pacing: a rate at which an advertiser runs their advertising;

Uniform pacing: allocated evenly based on budget and length of campaign;

Accelerated buying: buying based on performance (e.g., the system detects a whole population of car video watchers and autonomously allocates based on that discovery)

Competitive pacing: if an advertiser's competitor is heavily buying a particular slot, the advertiser can choose whether to compete with them, or to allocate away from those slots (this is applicable to any device medium)

Specified time-frame strategies: advertising is purchased based on the time of day, and day of the week. End-user advertisers can buy inventories across the entire day, e.g., run every six hours, or limit the purchasers to only specified times during the day.

Inventory strategy: advertising is purchased based on maximizing performance of advertising dollars spent or meeting specified campaign parameters and goals.

Pricing strategy: purchasing focuses on staying within a defined budget. Budgets can be allocated by dollar amount according to inventory, medium, and/or time-frame.

Medium strategy: system detects which medium performs best to meet campaign goals.

Segmented media planning is the practice of deploying a number of media strategies to different inventory types. Existing strategies fold many consumers into high-level consumer classifications. The present technology, however, is directed towards user-specific and device specific matching of inventory. In a preferred embodiment of the present invention, there is a one-to-one audience match to inventory. In other words, the advertiser can specify that a particular item of advertising content, such as online content, is directed to a particular individual. Furthermore, the one-to-one inventory to consumer match can be further delineated to a particular user-device such as a TV or mobile handset.

In one example of this process, an advertiser will set their media strategy directed towards a demographic defined as middle-aged women. The system can then segment the population of middle-aged women into various sub-segments, such as women with children, and women without children. Next, the system can match an advertising strategy, such as a uniform pacing strategy, to the individual level, say, a particular woman with children that has searched for diapers in the past hour. The system can then allocate the advertisement to a specific device of the woman, such as her mobile phone so that the next time she opens up an application, such as YouTube, the advert will display.

Delivering and Optimizing Cross-Screen Advertising Content

The technology described herein permits an advertiser to target advertising content to a consumer across more than one media conduit, including both TV and online media. In particular embodiments the advertiser is able to specifically bid on programmatic TV content using bidding methods as described elsewhere herein. There are two types of environment in which an advertiser can target a consumer. In a 1:1 environment, a DSP can just use the actual segment and/or a modeled out version of the actual segment, to make a real time decision to place the advert if the consumer matches the targeting parameters. In an index approach, when it is not possible to target 1:1 and it is not possible to do dynamic advert insertion or real time decisioning, the system instead looks at concentration of viewers projected to access the slot (such as a TV program or VOD program) and then targets the slots that have the highest concentration of the target consumers.

In a preferred embodiment, the advertiser has control over the allocation of the advertising content because the advertiser accesses the system via a unified interface that presents information about inventory, manages bids on the inventory, and provides a list of potential advertising targets consistent with a campaign description and the advertiser's budget. The system then communicates with, for example, supply-side providers and TV content distributors to ensure that the desired slots are purchased, typically via a bidding process, and the advertising content is delivered or caused to be delivered.

In one embodiment, the technology provides for an advertising campaign that involves delivery of content across two or more media conduits, as well as delivery of a single advertisement to multiple consumers at different times on, say, TV. The system thereby permits delivery of advertising content to a given consumer, or a population of consumers, on more than one device. For example, a consumer may view a portion of the campaign on a TV, and may also see the campaign within a desktop browser session on their laptop or on their OTT device. In this context, the TV inventory can be purchased across a variety of TV consumption devices that include, but are not limited to linear, time-shifted, traditional and programmatic TV, according to bid methodology described herein or familiar to those skilled in the art. In some instances, the advertiser desires to cap the number of impressions that a given consumer receives; in other instances, the advertiser wants to extend the campaign from one media to another based on metrics calculated across various media conduits. The method permits the advertiser to target segments of a population more precisely than before, as well as achieve fine scale refinement of a campaign based on performance indicators from more than one conduit.

There are two aspects of the technology that enable an advertiser to successfully manage and refine and advertising campaign: the system is able to keep track of which devices a given consumer can access, as well as on which devices the user has already been exposed to the advertising campaign; the system can also identify those consumers that are most likely to be interested in the campaign's content. Accuracy in targeting can thus be achieved via predictions based on a mapping of consumer behavior from aggregated cross-screen viewership data. Such information can be used continually when bidding on Programmatic TV, so that bids are refined and updated at a much faster frequency than would have been possible for linear TV.

The analytics portion of the system is capable of accepting unlimited data inputs regarding consumer behavior across various media. The system uses this data to optimize consumer classifications. A second part of the output is improved measurement and prediction of future consumer behaviors based on the data on cross-screen behavior.

Analysis of cross-screen data is able to determine where and when a consumer has viewed an advertisement, or a particular version of it, and thereby permits advertisers to schedule broadcast of an advertising campaign across multiple platforms. Advertisers can then schedule where, when, and how an advertisement is subsequently broadcast. They have control over retargeting (whether they show the same advertising more than once), or can choose to broadcast a multi-chapter advertising story.

One method for managing delivery of advertising content on TV to a population of consumers illustrated in FIG. 8. A consumer graph is, or has been, constructed 710, or is continually under construction and revision, according to methods described elsewhere herein, and a pool of consumers is defined 730, based on the graph of consumer properties, wherein the graph contains information about the devices used by each consumer and demographic data on each consumer, and wherein the pool of consumers contains consumers having at least a threshold similarity to a member of a target audience.

The system receives a list of advertising inventory 712 from one or more media conduits or TV content providers, wherein the list of inventory comprises one or more slots for TV.

The system receives a pricepoint 702 one or more campaign descriptions 705 from an advertiser, wherein each of the campaign descriptions 705 comprises a schedule for delivery of or more items of advertising content across two or more devices accessed by a consumer, and a target audience 720, wherein the target audience is defined by one or more demographic factors selected from factors such as: age range, gender, income, and location. Pricepoint 702 represents an advertiser's budget for the portion of the advertising campaign on TV. The budget can be allocated across multiple slots, according to the inventory and goals for the campaign. Goals may include the target audience desired to be reached, and the hoped for number of impressions.

Based on the pool of consumers, the campaign descriptions and available inventory, the system can identify one or more advertising targets, wherein each of the one or more advertising targets comprises one or more TV slots that are to be delivered within TV content identified as likely to be viewed by the pool of consumers, consistent with a given pricepoint 702 associated with a campaign description 705. (The assessment of likelihood of viewing by the pool is derived from the consumer graph (which allows the system to look at the pool of consumers' online views, and the TV data watched by given viewers and then to tie the online viewing to the TV viewing likelihood based on the combined information.) It is then possible to bid on 750 the one or more advertising targets based on the inventory. In the case of a successful bid, the content provider is instructed to deliver 770 the ad to the consumer consistent with the slots. In the case of a "hold", the bid clears along with other inventory.

The foregoing steps may be carried out in orders other than as described above, or iteratively, sequentially, or simultaneously, in part. Thus, the system may receive the campaign descriptions and pricepoint(s), at the same time as it receives advertising inventory, or beforehand, or afterwards. The consumer graph, additionally, may be continually being updated.

For a given consumer, a number of devices accessed by that consumer are identified 740. This can be from constructing a device graph as discussed elsewhere herein. Those consumers for which more than one device has been associated, can be targeted by an advertising campaign herein. This information can be used in refining the consumer pool.

Inputs to the system of the various categories of data (inventory, advertising campaigns, etc.) can be via various application program interfaces (APIs), the development of which is within the capability of one skilled in the art.

It is to be understood that the instructing and delivery steps are optional for a given entity performing the method, once the slots of TV inventory have been identified as consistent with the advertising campaign.

Figure 7:
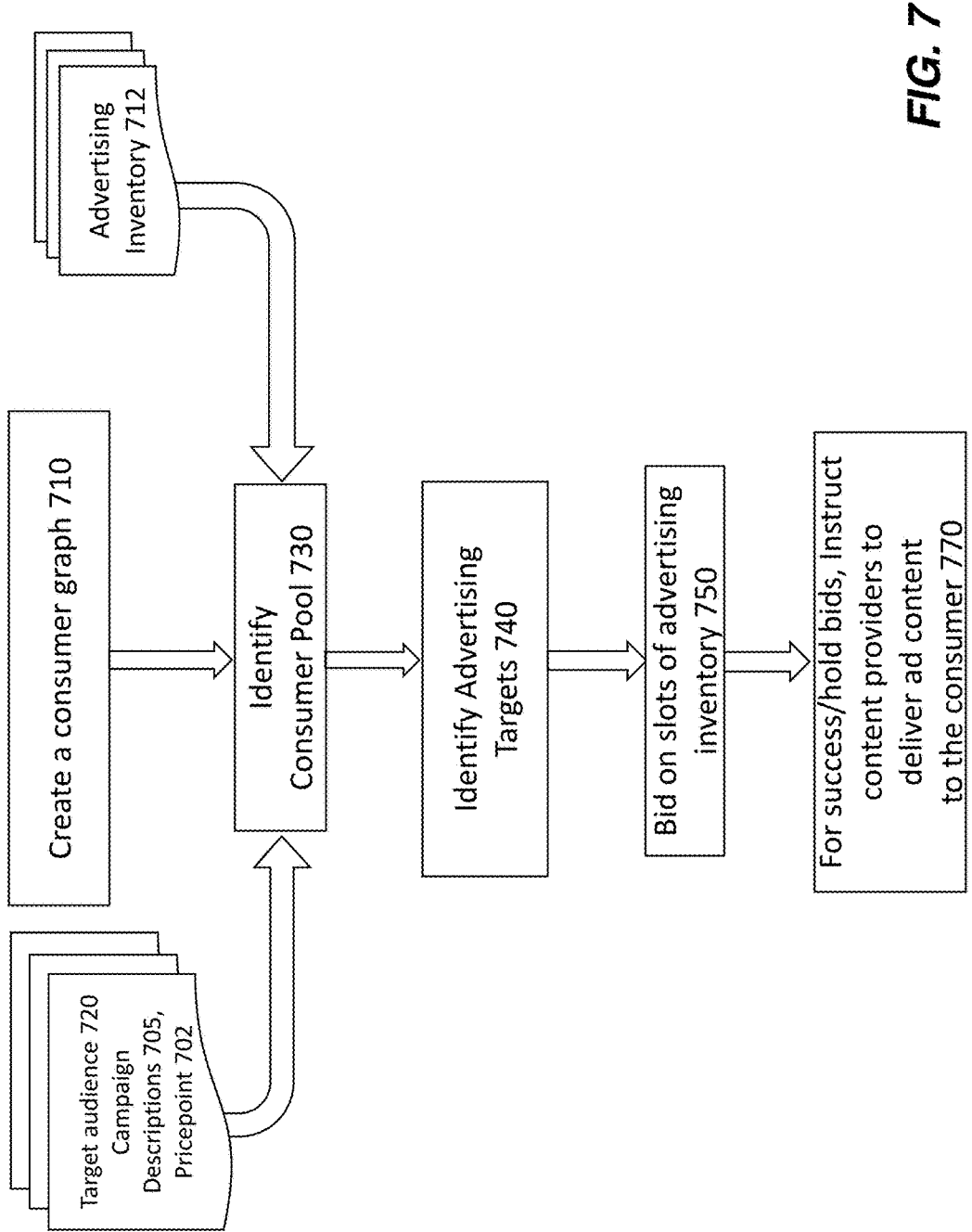
FIG. 7 shows a flow-chart of a process as described herein.

The methods herein can also be used to optimize an advertising campaign across a plurality of devices accessible to a consumer. Such methods build upon methods of delivery described hereinabove and with respect to FIG. 7. Once it has been determined that a consumer is a member of a target audience, and a first and second device accessible to the consumer have been identified, an advertiser wants to purchase of slots for a first and second item of advertising content on the first and second devices, consistent with an advertising budget and the target audience, in a manner that improves upon prior campaigns.

In this instance, the system can receive feedback on a consumer's response to the first and second items of advertising content, and based on that information as well as similar information from other consumers, it is possible to use the feedback to instruct purchase of further slots for the first and second items of advertising content.

For example, the system can receive a first datum from a first tag that accompanied the first item of advertising content to validate whether a particular consumer viewed the first item of advertising content on the first device as well as a second datum from a second tag that accompanied the second item of advertising content. A given datum of content can be a beacon, such as communicated via a protocol such as VPAID or VAST.

In some embodiments, a datum can comprise a confirmation of whether the consumer has seen the first item of advertising content, in which case the second item of advertising content is not delivered to the consumer until the consumer has seen the first item of advertising content.

In some embodiments, the advertising campaign can be optimized in a number of different ways. Although measurements of deduplicated reach, as described elsewhere herein, can be used to assess—and refine—the effectiveness of an advertising campaign, another factor is the overall cost effectiveness of the campaign. For example, given a budget, or a dollar-amount spent per advertisement, the cost per impression can be calculated. This number can be optimized over successive iterations of the campaign.

In other embodiments, an advertising campaign is updated and optimized during its own term. For example, a campaign may be scheduled to run over a particular time period, such as 3 days, 1 week, 2 weeks, 1 month, or 3 months. The system herein can provide feedback on the efficacy of the campaign before it is complete, and can therefore provide an advertiser with an ability and opportunity to adjust parameters of the campaign in order to improve its reach. Such parameters include, but are not limited to, aspects of audience demographic such as age, income, location, and media on which the advertisement is delivered, such as TV station, or time of day.

The system and methods herein can still further provide an advertiser with a way to project viewer data accumulated historically on to future potential viewing habits, for example, using look-alike modelling. The historical data can include data acquired during the course of the campaign.

Computational Implementation

The computer functions for manipulations of advertising campaign data, advertising inventory, consumer and device graphs in representations such as bit-strings, and bidding methods on programmatic TV content, can be developed by a programmer or a team of programmers skilled in the art. The functions can be implemented in a number and variety of programming languages, including, in some cases mixed implementations. For example, the functions as well as scripting functions can be programmed in functional programming languages such as: Scala, Golang, and R. Other programming languages may be used for portions of the implementation, such as Prolog, Pascal, C, C++, Java, Python, VisualBasic, Perl, .Net languages such as C#, and other equivalent languages not listed herein. The capability of the technology is not limited by or dependent on the underlying programming language used for implementation or control of access to the basic functions. Alternatively, the functionality could be implemented from higher level functions such as tool-kits that rely on previously developed functions for manipulating mathematical expressions such as bit-strings and sparse vectors.

The technology herein can be developed to run with any of the well-known computer operating systems in use today, as well as others, not listed herein. Those operating systems include, but are not limited to: Windows (including variants such as Windows XP, Windows95, Windows2000, Windows Vista, Windows 7, and Windows 8, Windows Mobile, and Windows 10, and intermediate updates thereof, available from Microsoft Corporation); Apple iOS (including variants such as iOS3, iOS4, and iOS5, iOS6, iOS7, iOS8, and iOS9, and intervening updates to the same); Apple Mac operating systems such as OS9, OS 10.x (including variants known as "Leopard", "Snow Leopard", "Mountain Lion", and "Lion"; the UNIX operating system (e.g., Berkeley Standard version); Android operating systems; and the Linux operating system (e.g., available from numerous distributors of free or "open source" software).

To the extent that a given implementation relies on other software components, already implemented, such as functions for manipulating sparse vectors, and functions for calculating similarity metrics of vectors, those functions can be assumed to be accessible to a programmer of skill in the art.

Furthermore, it is to be understood that the executable instructions that cause a suitably-programmed computer to execute the methods described herein, can be stored and delivered in any suitable computer-readable format. This can include, but is not limited to, a portable readable drive, such as a large capacity "hard-drive", or a "pen-drive", such as connects to a computer's USB port, an internal drive to a computer, and a CD-Rom or an optical disk. It is further to be understood that while the executable instructions can be stored on a portable computer-readable medium and delivered in such tangible form to a purchaser or user, the executable instructions can also be downloaded from a remote location to the user's computer, such as via an Internet connection which itself may rely in part on a wireless technology such as WiFi. Such an aspect of the technology does not imply that the executable instructions take the form of a signal or other non-tangible embodiment. The executable instructions may also be executed as part of a "virtual machine" implementation.

The technology herein maybe accessed via a web-browser interface but is not limited to a particular web browser version or type; it can be envisaged that the technology can be practiced with one or more of: Safari, Internet Explorer, Edge, FireFox, Chrome, or Opera, and any version thereof.

Computing Apparatus

Figure 9:
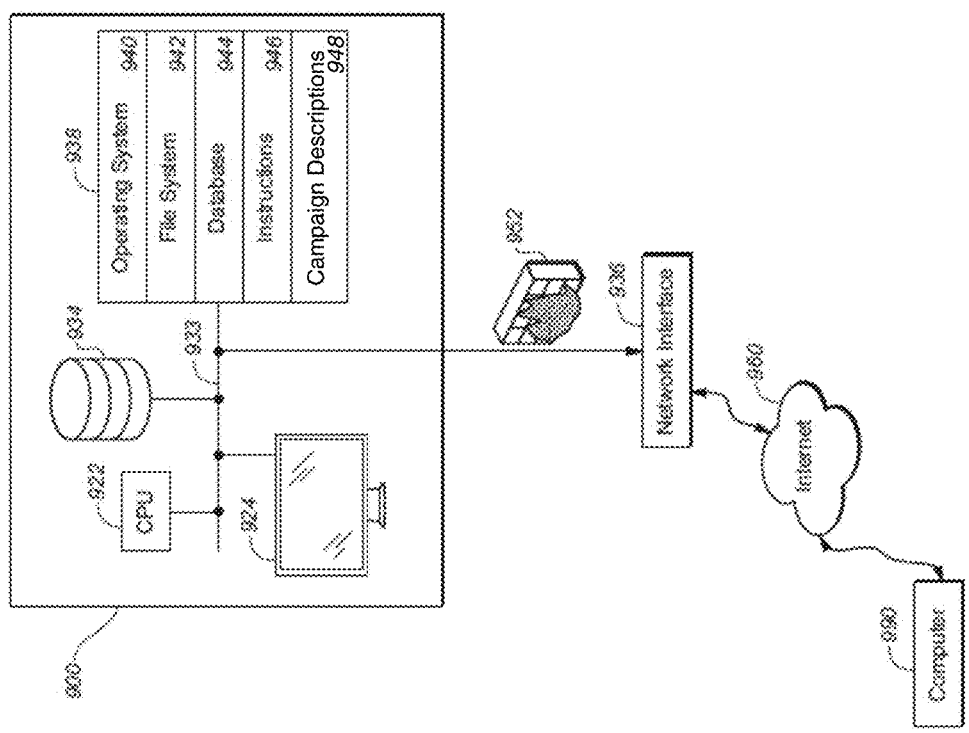
FIG. 9 shows an apparatus for performing a process as described herein.

An exemplary general-purpose computing apparatus 900 suitable for practicing the methods described herein is depicted schematically in FIG. 9.

The computer system 900 comprises at least one data processing unit (CPU) 922, a memory 938, which will typically include both high speed random access memory as well as non-volatile memory (such as one or more magnetic disk drives), a user interface 924, one more disks 934, and at least one network or other communication interface connection 936 for communicating with other computers over a network, including the Internet, as well as other devices, such as via a high speed networking cable, or a wireless connection. There may optionally be a firewall 952 between the computer and the Internet. At least the CPU 922, memory 938, user interface 924, disk 934 and network interface 936, communicate with one another via at least one communication bus 933.

CPU 922 may optionally include a vector processor, optimized for manipulating large vectors of data.

Memory 938 stores procedures and data, typically including some or all of: an operating system 940 for providing basic system services; one or more application programs, such as a parser routine 950, and a compiler (not shown in FIG. 9), a file system 942, one or more databases 944 that store advertising inventory 946, campaign descriptions 948, and other information, and optionally a floating point coprocessor where necessary for carrying out high level mathematical operations. The methods of the present invention may also draw upon functions contained in one or more dynamically linked libraries, not shown in FIG. 9, but stored either in memory 938, or on disk 934.

The database and other routines shown in FIG. 9 as stored in memory 938 may instead, optionally, be stored on disk 934 where the amount of data in the database is too great to be efficiently stored in memory 938. The database may also instead, or in part, be stored on one or more remote computers that communicate with computer system 900 through network interface 936.

Memory 938 is encoded with instructions for receiving input from one or more advertisers and for calculating a similarity score for consumers against one another. Instructions further include programmed instructions for performing one or more of parsing, calculating a metric, and various statistical analyses. In some embodiments, the sparse vector themselves are not calculated on the computer 900 but are performed on a different computer and, e.g., transferred via network interface 936 to computer 900.

Various implementations of the technology herein can be contemplated, particularly as performed on computing apparatuses of varying complexity, including, without limitation, workstations, PC's, laptops, notebooks, tablets, netbooks, and other mobile computing devices, including cell-phones, mobile phones, wearable devices, and personal digital assistants. The computing devices can have suitably configured processors, including, without limitation, graphics processors, vector processors, and math coprocessors, for running software that carries out the methods herein. In addition, certain computing functions are typically distributed across more than one computer so that, for example, one computer accepts input and instructions, and a second or additional computers receive the instructions via a network connection and carry out the processing at a remote location, and optionally communicate results or output back to the first computer.

Control of the computing apparatuses can be via a user interface 924, which may comprise a display, mouse 926, keyboard 930, and/or other items not shown in FIG. 9, such as a track-pad, track-ball, touch-screen, stylus, speech-recognition, gesture-recognition technology, or other input such as based on a user's eye-movement, or any subcombination or combination of inputs thereof. Additionally, implementations are configured that permit a purchaser of advertising inventory to access computer 900 remotely, over a network connection, and to view inventory via an interface having attributes comparable to 924.

In one embodiment, the computing apparatus can be configured to restrict user access, such as by scanning a QR-code, gesture recognition, biometric data input, or password input.

The manner of operation of the technology, when reduced to an embodiment as one or more software modules, functions, or subroutines, can be in a batch-mode—as on a stored database of inventory and consumer data, processed in batches, or by interaction with a user who inputs specific instructions for a single advertising campaign.

The results of matching advertising inventory to criteria for an advertising campaign and for bidding on programmatic TV slots, as created by the technology herein, can be displayed in tangible form, such as on one or more computer displays, such as a monitor, laptop display, or the screen of a tablet, notebook, netbook, or cellular phone. The results can further be printed to paper form, stored as electronic files in a format for saving on a computer-readable medium or for transferring or sharing between computers, or projected onto a screen of an auditorium such as during a presentation.

ToolKit: The technology herein can be implemented in a manner that gives a user (such as a purchaser of advertising inventory) access to, and control over, basic functions that provide key elements of advertising campaign management. Certain default settings can be built in to a computer-implementation, but the user can be given as much choice as possible over the features that are used in assigning inventory, thereby permitting a user to remove certain features from consideration or adjust their weightings, as applicable.

The toolkit can be operated via scripting tools, as well as or instead of a graphical user interface that offers touch-screen selection, and/or menu pull-downs, as applicable to the sophistication of the user. The manner of access to the underlying tools by a user is not in any way a limitation on the technology's novelty, inventiveness, or utility.

Accordingly, the methods herein may be implemented on or across one or more computing apparatuses having processors configured to execute the methods, and encoded as executable instructions in computer readable media.

For example, the technology herein includes computer readable media encoded with instructions for executing a method for having at least one processor configured to execute instructions for implementing a method for targeting delivery of advertising content to a population of consumers across one or more slots in television programming, the instructions including instructions for: receiving a pricepoint and one or more campaign descriptions from an advertiser, wherein each of the campaign descriptions comprises a schedule for delivery of an item of advertising content across one or more televisions accessed by a consumer in the population of consumers, and a target audience, wherein the target audience is defined by one or more demographic factors; defining a pool of consumers based on a graph of consumer properties, wherein the graph contains information about two or more TV and mobile devices used by each consumer, demographic and online behavioral data on each consumer, and similarities between pairs of consumers, and wherein the pool of consumers comprises consumers having at least a threshold similarity to a member of the target audience; receiving a list of inventory from one or more content providers, wherein the list of inventory comprises one or more TV slots; identifying one or more advertising targets, wherein each of the one or more advertising targets comprises one or more TV slots that are to be delivered within TV content identified as likely to be viewed by the pool of consumers, consistent with one or more of the campaign descriptions, and an overall cost consistent with the pricepoint; bidding on one or more of the TV slots in an advertising target; and if the bidding results in a success or a hold, instructing a media conduit to deliver the item of advertising content within the one or more TV slots to a consumer in the population of consumers on a television.

Correspondingly, the technology herein also includes a computing apparatus having at least one processor configured to execute instructions for implementing a method for executing a method for targeting delivery of advertising content to a population of consumers across one or more slots in television programming, the instructions including instructions for receiving a pricepoint and one or more campaign descriptions from an advertiser, wherein each of the campaign descriptions comprises a schedule for delivery of an item of advertising content across one or more televisions accessed by a consumer in the population of consumers, and a target audience, wherein the target audience is defined by one or more demographic factors; defining a pool of consumers based on a graph of consumer properties, wherein the graph contains information about two or more TV and mobile devices used by each consumer, demographic and online behavioral data on each consumer, and similarities between pairs of consumers, and wherein the pool of consumers comprises consumers having at least a threshold similarity to a member of the target audience; receiving a list of inventory from one or more content providers, wherein the list of inventory comprises one or more TV slots; identifying one or more advertising targets, wherein each of the one or more advertising targets comprises one or more TV slots that are to be delivered within TV content identified as likely to be viewed by the pool of consumers, consistent with one or more of the campaign descriptions, and an overall cost consistent with the pricepoint; bidding on one or more of the TV slots in an advertising target; and if the bidding results in a success or a hold, instructing a media conduit to deliver the item of advertising content within the one or more TV slots to a consumer in the population of consumers on a television.

Cloud Computing

The methods herein can be implemented to run in the "cloud." Thus the processes that one or more computer processors execute to carry out the computer-based methods herein do not need to be carried out by a single computing machine or apparatus. Processes and calculations can be distributed amongst multiple processors in one or more datacenters that are physically situated in different locations from one another. Data is exchanged with the various processors using network connections such as the Internet. Preferably, security protocols such as encryption are utilized to minimize the possibility that consumer data can be compromised. Calculations that are performed across one or more locations remote from an entity such as a DSP include calculation of consumer and device graphs, and updates to the same.

EXAMPLES

Example 1

Increasing PTV Inventory Win-Rate, and User Interface for Same

A first use case is to help advertisers buy TV inventory. In recent years, advertisers have been able to buy TV inventory programmatically, where inventory is auctioned off in an automated marketplace. In these auctions, buyers may have several attempts to bid on an item and receive win/loss notifications about each bid but no other information regarding the bid price of other buyers. This contrasts with traditional TV advertisement buying, where TV inventory is bought and sold through a process of negotiations between the sellers and advertisers.

In this use case, users would define an audience they wish to target, e.g., Males 25-34, select inventory from the auction they wish to buy and then submit it to an automated bidding system. In one exemplary implementation, the user can do this via a user interface shown in FIG. 8A. This interface allows advertisers to choose inventory according to a bid price; the interface shows a list of TV schedules in particular geographic regions and key data such as the number of estimated impressions as well as the current highest bid price. The list of target TV slots can be based on user input or can be machine a generated list, and can be ranked based on a forecasted audience, or the target Bid Price.

Figure 8B:
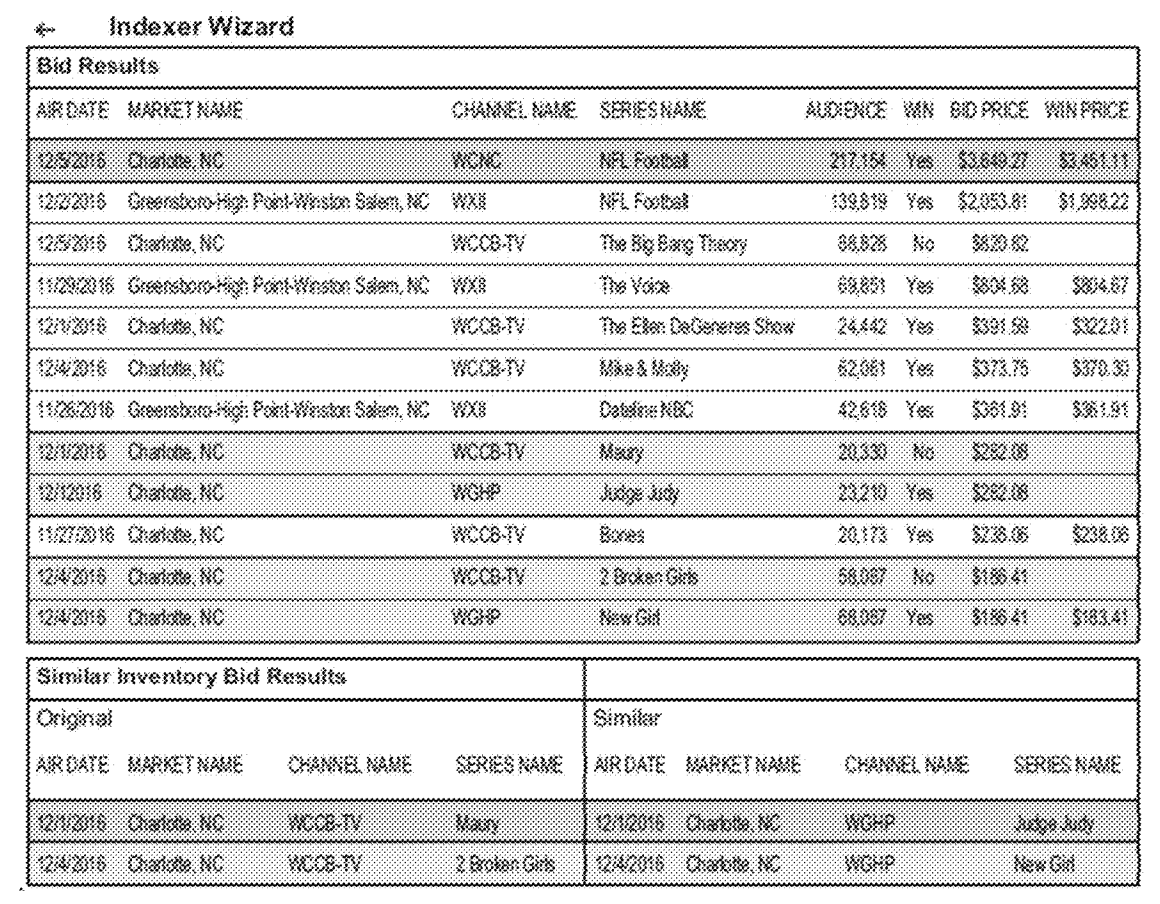

The automated bidding system will attempt to maximize the pieces of inventory won. When it can't win a piece of inventory, it will attempt to find a similar piece of inventory based on historical audience composition. This is shown in FIG. 8B, in which an exemplary user interface displays the outcome of a PTV bidding process: whether the slots were won, and if so the clearing price. The interface also shows the similar inventory that was purchased instead (because of a high match rate with the target audience) for some of the slots that weren't won.

Other aspects of an exemplary system include the possibility of advertisers to upload advertising content, select inventory, make bids, and monitor the success of a campaign as it is implemented. Other similar interfaces can be envisaged to allow an advertiser to place content in apps, and VOD environments.

Example 2

Cross-Screen Buying

A second use case is to allow advertisers to coordinate their digital and TV inventory buys. An advertiser's target audience will view content both on the internet and on TV. Some advertisers will want to target the same viewers within the same audience on both digital and TV to maximize the frequency with which those viewers see their advertisements. Other advertisers may want to target different viewers within the same audience in order to maximize the reach, i.e., the unique number of unique viewers seeing their advertisement.

In this case, users specify whether they want to maximize frequency or reach. Using data from the side of the advertiser's campaign that targets digital content, as can be obtained from, e.g., web cookies or IP addresses, the system can adjust its target audience forecasts for pieces of TV inventory, which in turn, is more informative to the advertisers.

Example 3

Look-alike Modeling

Look-alike modeling can be used to identify a pool of consumers from which a target set of TV viewers can be identified, against which a programmatic TV bid may be made. A population of consumers is modeled as having transmutable and non-transmutable characteristics. Both transmutable and non-transmutable characteristics are treated separately as macro categories. In other words, the relevant data representing either set of characteristics is divided into two separate bundles of information. Each consumer is associated with bundles of data regarding device behavior, categorized as either a transmutable characteristic or a non-transmutable characteristic. Each bundle is further sub-bundled by known consumption based on those characteristics. For example, a woman known to have had a child is represented as such within the set of transmutable characteristics, and therefore as likely to have the need to purchase diapers. That transmutable characteristic is known to evolve with time, meaning that in, say, two years, the purchasing tendency indicator will adjust with the growing age of the woman's child.

The look-alike modeling can also make other assumptions by aggregating known characteristics within either or both transmutable and non-transmutable categories, such as combining specific knowledge of purchasing history with consensus data on, for example, the person's income (or income bracket range). A purchasing behavior model can then be compared to a system generated archetype of the woman, showing likely behavior based on known characteristics. The behavior model of the specific user becomes more defined as more behavior data is collected such as third party purchasing histories, and consent-based device use data (such as IP address or device IDs from the manufacturer or user name associations on specific web services).

With this information, advertisers can make reliable assumptions that a specific user who is known to have characteristics X, Y and Z is also highly likely to engage with, for example, a specific luxury car brand advertisement, and the like. Thus, in the example of a woman who recently purchased diapers, it can also be deduced that the woman's household income is greater than $100,000, and as information is built up over time, the likely interest in types of purchases can be deduced.

The system can also anticipate changes in preference and adjusts to new data received accordingly. For instance, within the category of transmutable preferences, a change in profession, age, and marital status will adjust to reflect the user's change in purchasing preferences based on known and observable traits of similarly situated individuals. The system then provides inventory placement suggestions to advertisers based on these data point adjustments. Targeting and advertising planning is directed by a degree of data granularity that is in a continuous and synchronous state of change.

All references cited herein are incorporated by reference in their entireties.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the spirit or scope of the appended claims.

What is claimed:

1. A method for targeting delivery of advertising content to a population of consumers across one or more slots in television programming, the method being performed by at least one computer system containing at least one processor and at least one memory storing instructions that when executed by the at least one processor, cause the at least one computer system to perform operations comprising:
   receiving by the at least one processor a pricepoint and one or more campaign descriptions from an advertiser, wherein each of the campaign descriptions comprises a schedule for delivery of an item of advertising content across one or more televisions accessed by a consumer in the population of consumers, and a target audience, wherein the target audience is defined by one or more demographic factors;
   defining, by the at least one processor, a pool of consumers based on a graph of consumer properties, the graph being of a set of nodes and edges connecting pairs of nodes, wherein a node represents a consumer and two nodes that are connected by an edge are similar to one another according to at least a criterion, and wherein a weight of an edge defines a strength of similarity, wherein the graph contains information about two or more TV and mobile devices used by each consumer, demographic and online behavioral data on each consumer, and similarities between pairs of consumers, and wherein the pool of consumers comprises consumers having at least a threshold similarity to a member of the target audience;
   receiving by the at least one processor a list of inventory from one or more content providers, wherein the list of inventory comprises one or more TV slots;
   identifying by the at least one processor one or more advertising targets, wherein each of the one or more advertising targets comprises one or more TV slots that are to be delivered within TV content identified as likely to be viewed by the pool of consumers, consistent with one or more of the campaign descriptions, and an overall cost consistent with the pricepoint;
   bidding, by the at least one processor, on one or more of the TV slots in an advertising target; and
   if the bidding results in a success or a hold,
   instructing, by the at least one processor, a media conduit to deliver the item of advertising content within the one or more TV slots to a consumer in the population of consumers on a television.

2. The method of claim 1, wherein the bidding includes calculating a probability that the bid price will have an outcome of a win or a hold.

3. The method of claim 1, wherein the TV content identified as likely to be viewed by the pool of consumers is based on a key performance indicator selected from audience reach and direct response.

4. The method of claim 1, further comprising placing a further bid if the first bidding is either a hold or a loss.

5. The method of claim 1, wherein one or more of the advertising targets includes a gross rating point.

6. The method of claim 1, wherein one or more of the slots includes a programming time selected from: program, and daypart.

7. The method of claim 1, wherein one or more of the slots includes a geographic indicator selected from: DMA, national, and zip-code.

8. The method of claim 2 wherein the probability is calculated as a Bayesian distribution.

9. The method of claim 1, wherein the graph of consumer properties comprises information that has been obtained probabilistically at least in part.

10. A computing apparatus having at least one processor configured to execute instructions for implementing a method for targeting delivery of advertising content to a population of consumers across one or more slots in television programming, wherein the instructions are encoded on a tangible computer-readable medium and include instructions for:
receiving by the at least one processor a pricepoint and one or more campaign descriptions from an advertiser, wherein each of the campaign descriptions comprises a schedule for delivery of an item of advertising content across one or more televisions accessed by a consumer in the population of consumers, and a target audience, wherein the target audience is defined by one or more demographic factors;
defining, by the at least one processor, a pool of consumers based on a graph of consumer properties, the graph being of a set of nodes and edges connecting pairs of nodes, wherein a node represents a consumer and two nodes that are connected by an edge are similar to one another according to at least a criterion, and wherein a weight of an edge defines a strength of similarity, wherein the graph contains information about two or more TV and mobile devices used by each consumer, demographic and online behavioral data on each consumer, and similarities between pairs of consumers, and wherein the pool of consumers comprises consumers having at least a threshold similarity to a member of the target audience;
receiving by the at least one processor a list of inventory from one or more content providers, wherein the list of inventory comprises one or more TV slots;
identifying by the at least one processor one or more advertising targets, wherein each of the one or more advertising targets comprises one or more TV slots that are to be delivered within TV content identified as likely to be viewed by the pool of consumers, consistent with one or more of the campaign descriptions, and an overall cost consistent with the pricepoint;
bidding, by the at least one processor, on one or more of the TV slots in an advertising target; and
if the bidding results in a success or a hold,
instructing, by the at least one processor, a media conduit to deliver the item of advertising content within the one or more TV slots to a consumer in the population of consumers on a television.

11. The computing apparatus of claim 10, wherein the graph of consumer properties comprises information that has been obtained probabilistically at least in part.

12. The computing apparatus of claim 10, wherein the bidding includes calculating a probability that the bid price will have an outcome of a win or a hold.

13. The computing apparatus of claim 12 wherein the probability is calculated as a Bayesian distribution.

14. The computing apparatus of claim 10, wherein the TV content identified as likely to be viewed by the pool of consumers is based on a key performance indicator selected from audience reach and direct response.

15. The computing apparatus of claim 10, further comprising placing a further bid if the first bidding is either a hold or a loss.

16. The computing apparatus of claim 10, wherein one or more of the advertising targets includes a gross rating point.

17. The computing apparatus of claim 10, wherein one or more of the slots include a programming time selected from: program, and daypart.

18. The computing apparatus of claim 10, wherein one or more of the slots include a geographic indicator selected from: DMA, national, and zip-code.

19. A non-transitory computer-readable medium encoded with instructions for executing a method for targeting delivery of advertising content to apopulation of consumers across one or more slots in television programming, the instructions to be executed on one or more suitably configured computer processors, and including instructions for:
receiving a pricepoint and one or more campaign descriptions from an advertiser, wherein each of the campaign descriptions comprises a schedule for delivery of an item of advertising content across one or more televisions accessed by a consumer in the population of consumers, and a target audience, wherein the target audience is defined by one or more demographic factors;
defining a pool of consumers based on a graph of consumer properties, the graph being of a set of nodes and edges connecting pairs of nodes, wherein a node represents a consumer and two nodes that are connected by an edge are similar to one another according to at least a criterion, and wherein a weight of an edge defines a strength of similarity, wherein the graph contains information about two or more TV and mobile devices used by each consumer, demographic and online behavioral data on each consumer, and similarities between pairs of consumers, and wherein the pool of consumers comprises consumers having at least a threshold similarity to a member of the target audience;
receiving a list of inventory from one or more content providers, wherein the list of inventory comprises one or more TV slots;
identifying one or more advertising targets, wherein each of the one or more advertising targets comprises one or more TV slots that are to be delivered within TV content identified as likely to be viewed by the pool of consumers, consistent with one or more of the campaign descriptions, and an overall cost consistent with the pricepoint;
bidding on one or more of the TV slots in an advertising target; and
if the bidding results in a success or a hold,
instructing a media conduit to deliver the item of advertising content within the one or more TV slots to a consumer in the population of consumers on a television.

20. The computer readable medium of claim 19, wherein the graph of consumer properties comprises information that has been obtained probabilistically at least in part.

21. The computer readable medium of claim 19, wherein the bidding includes calculating a probability that the bid price will have an outcome of a win or a hold.

22. The computer readable medium of claim 21 wherein the probability is calculated as a Bayesian distribution.

23. The computer readable medium of claim 19, wherein the TV content identified as likely to be viewed by the pool of consumers is based on a key performance indicator selected from audience reach and direct response.

24. The computer readable medium of claim 19, further comprising placing a further bid if the first bidding is either a hold or a loss.

25. The computer readable medium of claim 19, wherein one or more of the advertising targets includes a gross rating point.

26. The computer readable medium of claim 19, wherein one of more of the slots includes a programming time selected from: program, and daypart.

27. The computer readable medium of claim 19, wherein one of more of the slots includes a geographic indicator selected from: DMA, national, and zip-code.

* * * * *